US009588015B2

(12) United States Patent
Sako et al.

(10) Patent No.: US 9,588,015 B2
(45) Date of Patent: Mar. 7, 2017

(54) DIAGNOSTIC METHOD AND DIAGNOSTIC DEVICE FOR A SLIDE BEARING

(75) Inventors: Takashi Sako, Tokyo (JP); Kouichi Tamura, Tokyo (JP)

(73) Assignee: ASAHI KASEI ENGINEERING CORPORATION, Osaka-Shi (JP)

( * ) Notice: Subject to any disclaimer, the term of this patent is extended or adjusted under 35 U.S.C. 154(b) by 679 days.

(21) Appl. No.: 13/582,288

(22) PCT Filed: Feb. 21, 2011

(86) PCT No.: PCT/JP2011/053734
§ 371 (c)(1),
(2), (4) Date: Sep. 12, 2012

(87) PCT Pub. No.: WO2011/108391
PCT Pub. Date: Sep. 9, 2011

(65) Prior Publication Data
US 2013/0006551 A1     Jan. 3, 2013

(30) Foreign Application Priority Data
Mar. 3, 2010 (JP) ................................. 2010-046767

(51) Int. Cl.
G01M 13/04     (2006.01)
G01H 1/14      (2006.01)

(52) U.S. Cl.
CPC ............ *G01M 13/045* (2013.01); *G01H 1/14* (2013.01)

(58) Field of Classification Search
None
See application file for complete search history.

(56) References Cited

U.S. PATENT DOCUMENTS

| 7,027,953 B2* | 4/2006 | Klein ................... G01H 1/006 702/182 |
| 2002/0038199 A1* | 3/2002 | Blemel ........................ 702/183 |

(Continued)

FOREIGN PATENT DOCUMENTS

| CN | 1825082 A | 8/2006 |
| JP | 3-191859 A | 8/1991 |

(Continued)

OTHER PUBLICATIONS

Junsheng et al., "Application of an impulse response wavelet to fault diagnosis of rolling bearings," Mechanical Systems and Signal Processing (2007), vol. 21, pp. 920-929.

(Continued)

*Primary Examiner* — Aditya Bhat
(74) *Attorney, Agent, or Firm* — Birch, Stewart, Kolasch & Birch, LLP

(57) ABSTRACT

A sign of a minor rubbing abnormality of a slide bearing in a diesel engine is accurately detected. In order to realize the accurate detection, the following is performed: detecting waveform data which represents an acceleration of a vibration which occurs when a slide bearing is in operation; transforming acceleration waveform data into an acceleration spectrum of a frequency domain by applying a Fourier transform to the acceleration waveform data; quantifying a plurality of peak information which occurs at a rotational frequency interval of a shaft to be measured in the acceleration spectrum by performing a predetermined signal process combined with rotational frequency information of the shaft; obtaining a characteristic value; monitoring whether the obtained characteristic value has exceeded a predetermined threshold value; and when the characteristic value has exceeded the threshold value, determining that an abnormality has occurred in the slide bearing.

11 Claims, 24 Drawing Sheets

(56) References Cited

U.S. PATENT DOCUMENTS

| | | | |
|---|---|---|---|
| 2003/0106375 A1* | 6/2003 | Sabini | G01H 1/003 |
| | | | 73/593 |
| 2005/0049835 A1 | 3/2005 | Mayer et al. | |
| 2008/0033695 A1 | 2/2008 | Sahara et al. | |
| 2008/0234964 A1 | 9/2008 | Miyasaka et al. | |

FOREIGN PATENT DOCUMENTS

| | | |
|---|---|---|
| JP | 8-261817 A | 10/1996 |
| JP | 11-83617 A | 3/1999 |
| JP | 2000-214052 A | 8/2000 |
| JP | 2004-20193 A | 1/2004 |
| JP | 2009-020090 A | 1/2009 |
| KR | 10-2007-0105288 A | 10/2007 |
| WO | WO 2009/096551 A1 | 8/2009 |
| WO | WO 2009/133124 A1 | 11/2009 |

OTHER PUBLICATIONS

Office Action issued Jul. 18, 2013, in Chinese Patent Application No. 201180011831.3.
Author Unknown, "2. Data processing using inverse transform information filter," Takada Technical Report, vol. 14, Apr. 1, 2004, pp. 11-15, with a partial English translation.

* cited by examiner

CROSS-CORRELATION

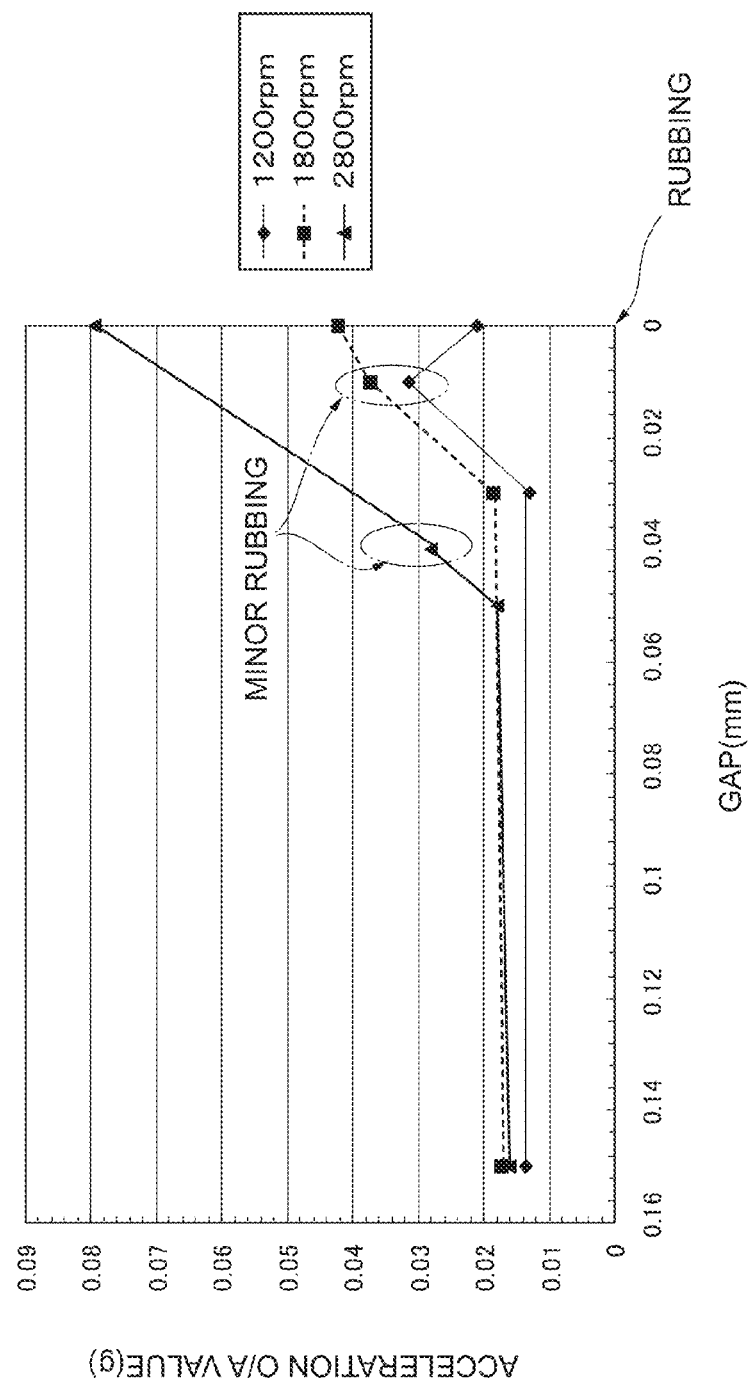

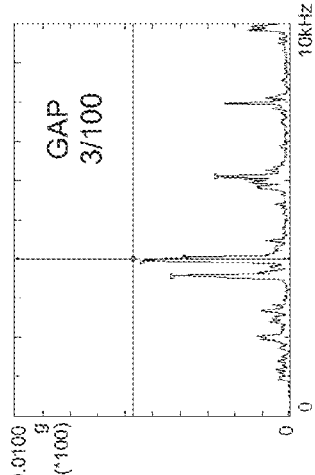
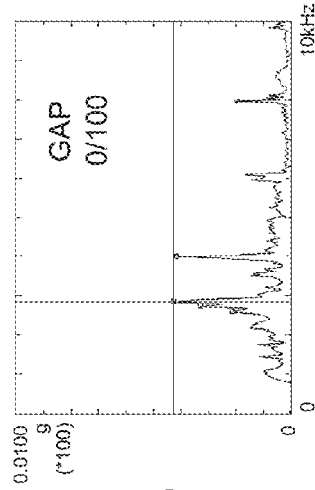
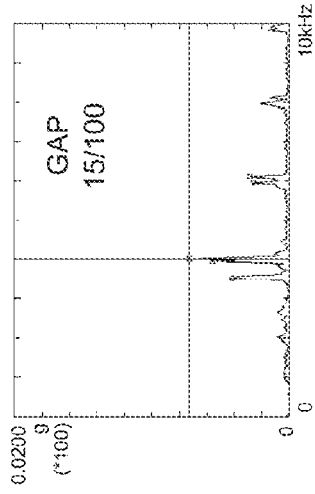
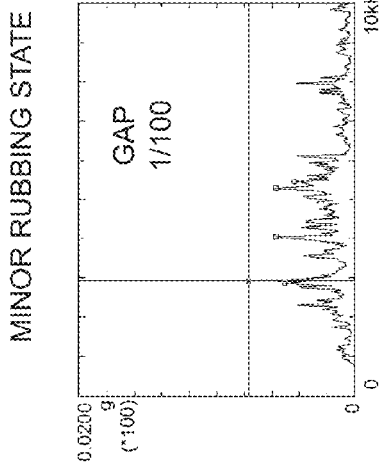

REVOLUTION SPEED: 1200RPM ZOOMING SPECTRUM

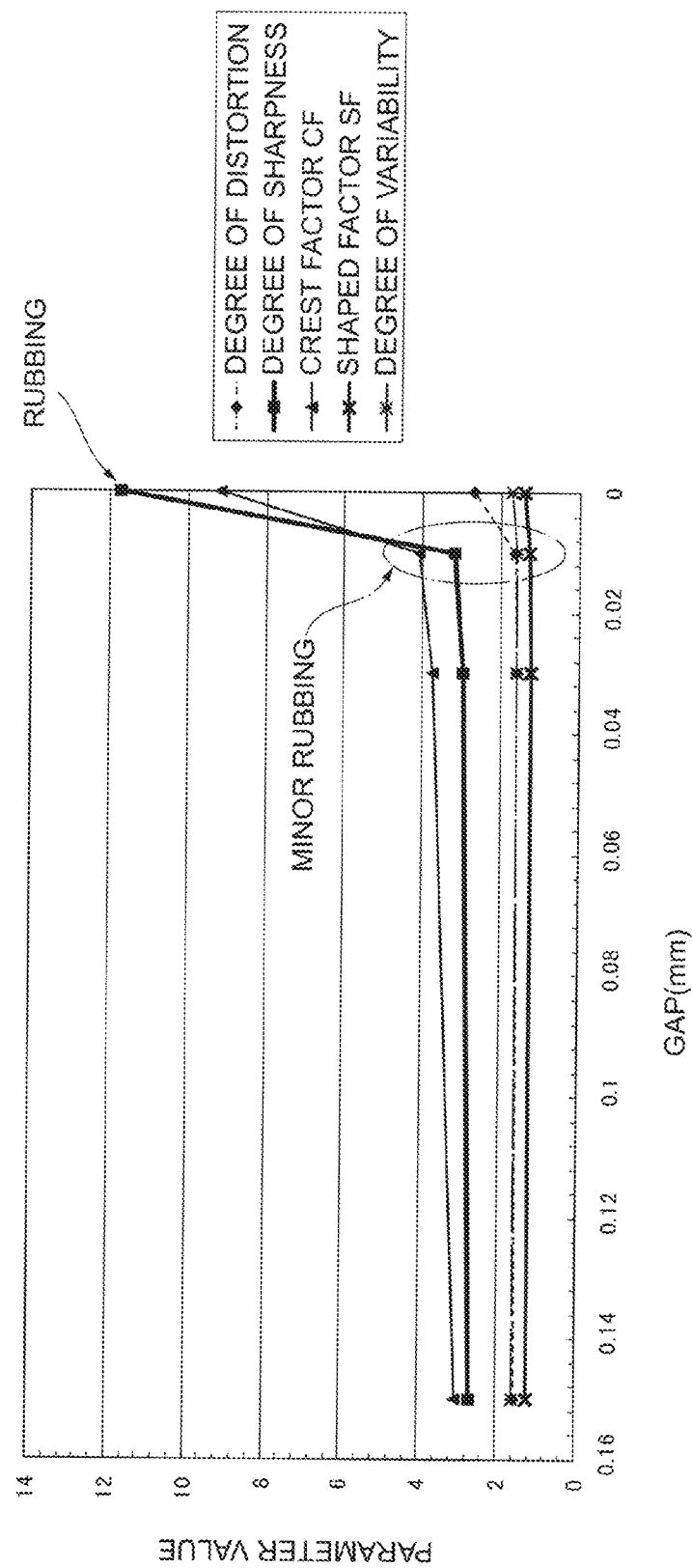

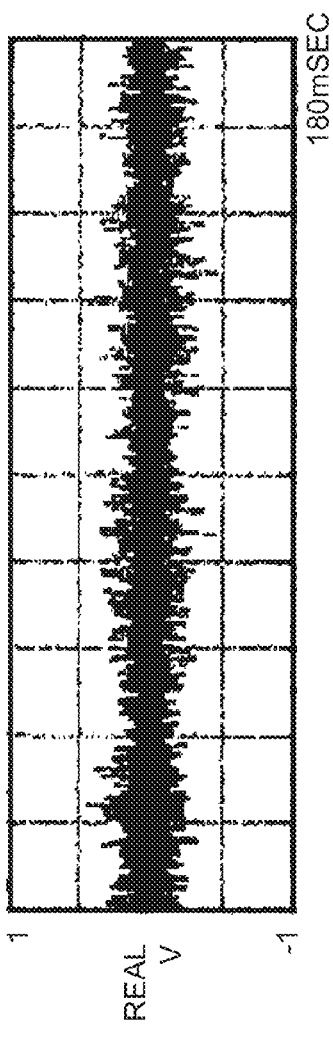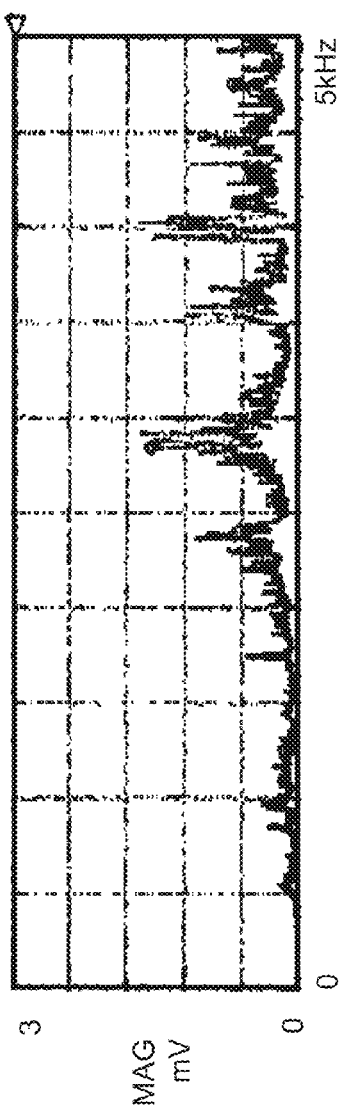
FIG. 12A ACCELERATION WAVEFORM
FIG. 12B ACCELERATION SPECTRUM

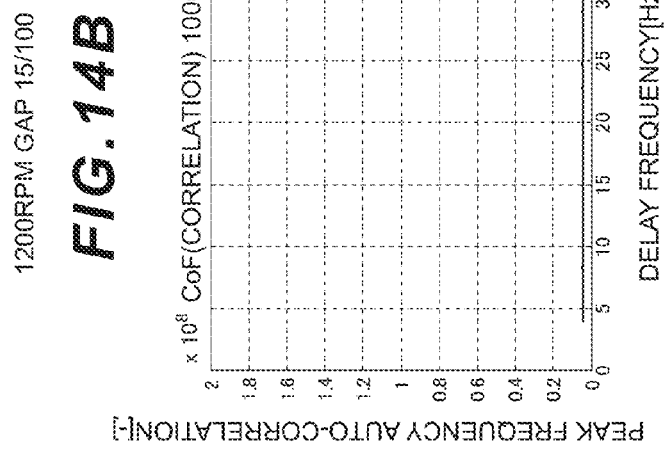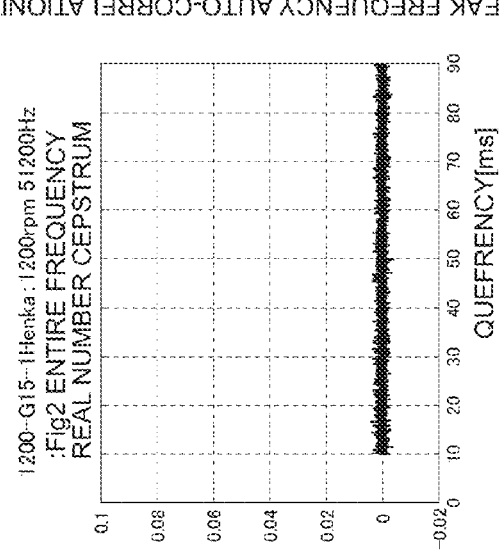
FIG. 14A CEPSTRUM
FIG. 14B AUTO-CORRELATION
FIG. 14C CROSS-CORRELATION COMPARISON BETWEEN QUEFRENCY LEVEL AND CONVENTIONAL METHOD
ABNORMAL / NORMAL (1200rpm)

COMPARISON BETWEEN EACH OF THE CHARACTERISTIC VALUES
1200RPM

COMPARISON BETWEEN QUEFRENCY LEVEL AND CONVENTIONAL METHOD
ABNORMAL / NORMAL(2800rpm)

COMPARISON BETWEEN EACH OF THE CHARACTERISTIC VALUES
2800RPM

94RPM ACCELERATION WAVEFORM IN A NORMAL STATE

ENVELOPE SPECTRUM
(FREQUENCY ANALYSIS AFTER AN ENVELOPE PROCESSING)

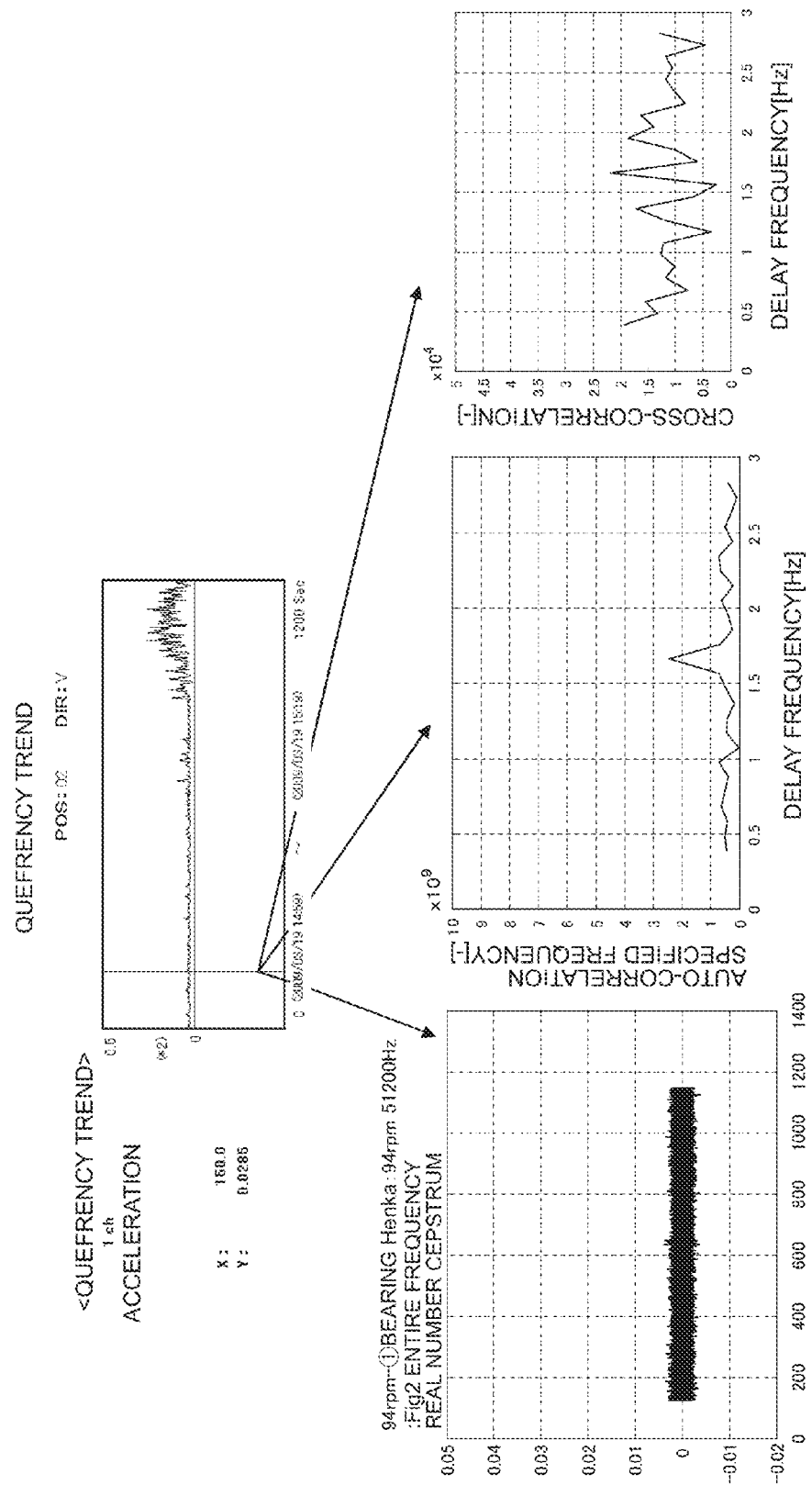

85RPM ACCELERATION WAVEFORM IN AN ABNORMAL STATE

ENVELOPE SPECTRUM

DIAGNOSTIC METHOD AND DIAGNOSTIC DEVICE FOR A SLIDE BEARING

CROSS-REFERENCE TO RELATED APPLICATIONS

This application is the National Phase of PCT International Application No. PCT/JP2011/053734, filed on Feb. 21, 2011, which claims priority under 35 U.S.C. §119(a) to Patent Application No. 2010-046767, filed in Japan on Mar. 3, 2010, all of which are hereby expressly incorporated by reference into the present application.

TECHNICAL FIELD

The present invention relates to a diagnostic method and a diagnostic device for a slide bearing. More particularly, the present invention relates to an improvement of a diagnostic analysis method for detecting a sign of a bearing contact (rubbing) specific to a slide bearing of a ship or a power generation facility.

BACKGROUND ART

In addition to general industrial use, such as large-sized critical rotating equipment like turbines or blowers, or rapid rotating equipment or critical equipment like compressors, the slide bearing is also used as a bearing of a diesel engine for a ship or a power generation facility. The slide bearing, in general, is not subjected to damage since it is surrounded by an oil film and rotates in a contactless manner. However, an execution failure or a blade unbalance can cause a coupling misalignment, and a rotating shaft can contact (rub) the slide bearing due to an abnormal vibration caused by an oil whip, thereby causing damage. When some kind of abnormality occurs in the slide bearing, a vibration or sound occurs that is different from usual. If an actuation is continued in such a state, damage may be caused. Moreover, if the rubbing abnormality continues, a burn may occur, thereby resulting in a stop in the equipment.

As a technique of diagnosing the slide bearing in order to avoid such situation, conventionally, a method using a shaft vibration due to an eddy current type sensor or a bearing housing vibration due to a piezoelectric acceleration sensor is suggested. For example, when a spectral pattern obtained by applying a fast Fourier transform (FFT) to waveform data such as vibrations or sound which occur from the slide bearing is compared to a preset spectral pattern in an emergency condition, the slide bearing could be diagnosed based on the compared result.

As a method for determining whether or not there is a rubbing in the slide bearing, etc. (contact between the rotational part and the stationary part), the following method is proposed, the method comprising: for example, detecting the sound which occurs when the rotating shaft contacts the bearing; retrieving the acoustic signal; subjecting the acoustic signal to an envelope detection process (envelope process); forming data after the envelope detection; comparing a cepstrum value with a reference value; and, based on this determination result, performing a rubbing determination (see patent document 1). If the occurrence of the rubbing phenomenon which is an initial stage of a burn damage of the slide bearing can be detected early, at a minor stage, the burn damage may be obviated.

PRIOR ART DOCUMENT

Patent Document

Patent Document 1: JP8-261817 A

SUMMARY OF THE INVENTION

Problem to be Solved by the Invention

In the conventional method using a shaft vibration due to an eddy current type sensor or a bearing housing vibration due to a piezoelectric acceleration sensor as described above, however, it is difficult to detect the sign of a minor rubbing abnormality in a slide bearing for general industrial use, such as a turbine. Particularly, since a diesel engine for a ship or a power generation facility involves a vibration noise associated with a piston movement and a burst or supply/exhaust, the technique itself for detection of the rubbing of the bearing as well as for detection of the contamination of foreign substances in the oil by a vibration method, is not used.

Although detection of a rubbing of a bearing is possible in a method using data after an envelope detection process of an acoustic signal, this method focuses only on the amplitude modulation component. Thus, the accuracy in diagnosing the abnormality may be poor. Particularly, since a diesel engine, such as of a ship or a power generation facility, involves a vibration noise associated with a piston movement and a burst or supply/exhaust, the technique itself for detection of the rubbing of the bearing as well as for detection of the contamination of foreign substances in the oil by an acoustic method, is not used.

The object of the present invention is to provide a diagnostic method and a diagnostic device which is capable of accurately detecting the sign of a minor rubbing abnormality of a slide bearing.

Means for Solving the Problem

The present inventors have made various considerations to achieve the accurate detection of the abnormalities specific to slide bearings only with an acceleration sensor and an application to slide bearings which involves a vibration noise associated with a piston movement and a burst or supply/exhaust, as in a diesel engine. As a result, it has been found that, when a minor rubbing phenomenon occurs, the spectrum in which the acceleration waveform has been changed to the frequency domain (hereinafter, referred to as the acceleration spectrum) is subjected to a frequency modulation in addition to the amplitude modulation even though the increase in the acceleration level is small. Moreover, it has been found that the frequency modulation is configured of a plurality of peaks at a rotational frequency interval of a shaft to be detected (hereinafter, simply referred to as the shaft). Furthermore, the present inventors have conceived of quantitatively capturing minor rubbings by subjecting peak information which occurs at a rotational frequency interval of the shaft of the acceleration spectrum to a predetermined signal process using rotational frequency information of the shaft, and thus gaining new knowledge leading to the solving of the problem.

In addition, the present inventors have performed an experiment which forcibly generates a rubbing in the slide bearing and found out that the frequency modulation is clearly generated in a minor rubbing stage. Furthermore, it has been found out that an abnormality detection from the minor rubbing stage would be possible by retrieving the frequency modulation component by a cepstrum analysis. Since the quefrency of a rotational period occurs when a rubbing is generated, a rotational period is automatically calculated from the revolution speed obtained from a revolution indicator to monitor a peak value of the quefrency corresponding to the rotational period. If this peak value exceeds the predetermined threshold value, the occurrence of the rubbing may be informed such as by an alarm device.

The present invention is based on this finding and is as follows. Namely, the present invention performs the following: detecting waveform data which represents an acceleration of a vibration which occurs when a slide bearing is in operation; transforming acceleration waveform data into an acceleration spectrum of a frequency domain by applying a Fourier transform to the acceleration waveform data; quantifying a plurality of peak information which occurs at a rotational frequency interval of a shaft to be measured in the acceleration spectrum by performing a predetermined signal process combined with rotational frequency information of the shaft; obtaining a characteristic value; monitoring whether the obtained characteristic value has exceeded a predetermined threshold value; and when the characteristic value has exceeded the threshold value, determining that an abnormality has occurred in the slide bearing.

According to the diagnostic method according to the present invention, the sensitivity is higher than that of the conventional detection method which has focused only on amplitude modulation. Even when a vibration noise associated with a piston movement and a burst or supply/exhaust, as in the slide bearing of a diesel engine, are involved, the rubbing phenomenon can be detected in a highly-sensitive manner by detecting the frequency modulation (a plurality of peak information at a rotational frequency interval of a shaft) which is associated with a rubbing.

Here, the present invention and the conventional technique will be compared. In a slide bearing diagnosis, it has been proposed that a frequency analysis be performed after subjecting a burst type waveform of an acoustic signal, which occurs due to contact of the shaft, to an envelope detection process. However, this method does not detect the frequency modulation but instead diagnoses the slide bearing based only on the amplitude modulation component of the data, and thus it is a method with a different principle than that of the present invention. In addition, for example, when an abnormality such as a backlash, which only occurs with the amplitude modulation component in the slide bearing, occurs, in a frequency analysis after the enveloping, the rotational frequency and the high-order component thereof similar to that during the rubbing occur due to a backlash. Thus, it would be difficult to differentiate from the rubbing abnormality and the diagnostic accuracy may be low. In this regard, according to the present invention, which directly analyzes the frequency of the vibration signal and processes the frequency modulation which occurs at a revolution speed interval of the shaft occurring thereat, since there would be no frequency modulation even if a backlash were to occur, the determination of the rubbing abnormality would be possible.

The detailed description regarding the above will be described below. Firstly, in general, when a backlash vibration occurs, an amplitude modulation occurs in which the amplitude of a time-axis waveform increases and decreases. In this case, in a spectrum which has been subjected to an envelope detection process, an occurrence of a rotational frequency and a high order component thereof can be found. Since the same applies to rubbing, the differentiation between the rubbing and the backlash is difficult in a cepstrum after the envelope detection process. With respect to this, when a rubbing (contact) occurs, in addition to the amplitude modulation, a strong rubbing and a soft rubbing also occur, thereby resulting in a time-axis waveform of a compression wave, namely a waveform that has received a frequency modulation. According to the conventional method, at the point when an envelope detection process of this time-axis waveform is performed, only the amplitude modulation is withdrawn and the frequency modulation is ignored. Namely, in a waveform after the envelope detection process according to such conventional method, a frequency modulation cannot be analyzed.

With respect to this, in a minor rubbing, it is possible to remarkably detect the rubbing by quantitatively extracting the plurality of peak information subjected to the frequency modulation corresponding to the rotational frequency of the shaft from the revolution speed information of the shaft in a predetermined method. In addition, since there is no frequency modulation in a backlash, the occurrence at a rotational frequency interval in a spectrum is not remarkable, and the rubbing and the backlash can be differentiated. The above are the features of the present invention which are different from the conventional method.

As a specific example of a diagnostic method according to the present invention, it is preferable to perform a cepstrum calculation which applies an inverse Fourier transform after a logarithmic transformation is applied to an acceleration spectrum, obtain time-series data of a quefrency value which is obtained from waveform data after the cepstrum calculation, monitor whether or not the quefrency value has exceeded the predetermined threshold value, and when the quefrency value has exceeded the threshold value, determine that an abnormality has occurred in the slide bearing.

In comparison to auto-correlation and cross-correlation, which will be described later, the cepstrum calculation has a lower frequency dependency of an acceleration spectrum used in a calculation. Therefore, usually, the cesptrum calculation can be applied to the diagnostic technique by calculating within an effective frequency domain determined from the sampling interval of data collection and the sensitivity of the sensor.

As a further example of a diagnostic method which is different from the cepstrum calculation, it is preferable to perform a calculation which determines an auto-correlation of an acceleration spectrum obtained from the acceleration data, monitor whether or not the auto-correlation value obtained by the calculation has exceeded the predetermined threshold value and when the auto-correlation value has exceeded the predetermined threshold value, determine that an abnormality has occurred in the slide bearing.

As a further example of a diagnostic method that is different from the above two examples, it is preferable to perform a calculation which determines a cross-correlation between the acceleration spectrum and the predetermined spectrum, monitor whether or not the cross-correlation value obtained by the calculation has exceeded the predetermined threshold value and when the cross-correlation value has exceeded the threshold value, determine that an abnormality has occurred in the slide bearing.

When an abnormality has occurred in the slide bearing, unless the acceleration of the vibration which occurs due to the abnormality is significantly large, usually, the abnormality is merely such that the rotating shaft slightly contacts the inner periphery of the bearing, and thus the change in the acceleration waveform data is small. Therefore, it is extremely difficult to detect the abnormality only from the waveform data. However, even if there is a slight contact, in an acceleration spectrum of a frequency domain in which the acceleration waveform data has been Fourier-transformed, the present inventors have found out that the frequency modulation, that is, the plurality of peaks which occurs at a rotational frequency interval of the shaft, will occur. Namely, since the frequency modulation occurs at a rotational frequency interval of the shaft, it is possible to obtain a characteristic value which involves a frequency modulation by performing a predetermined signal process in which the rotational frequency information of the shaft and the acceleration spectrum of the frequency domain are combined. When the characteristic value is monitored and it exceeds the predetermined threshold value, it can be determined that the slide bearing to be measured is abnormal.

Various methods may be considered as a method for obtaining the characteristic value and a method for diagnosing an abnormality. For example, when the acceleration spectrum of the frequency domain is converted to a logarithm and an analysis in which this logarithm spectrum is inverse Fourier transformed, i.e. a cepstrum analysis is performed, a cepstrum in which a quefrency of a part corresponding to a rotational period in the slide bearing appears can be obtained. The horizontal axis of the cepstrum has a time dimension since the function on the frequency axis is Fourier-transformed. Then, time series data on a level of a quefrency value (defined as a quefrency level) which corresponds to a shaft rotational period of a slide bearing part to be diagnosed is obtained, the quefrency level is monitored as to whether or not it has exceeded the predetermined threshold value, and when the quefrency value has exceeded the threshold value during the monitoring, it can be determined that an abnormality has occurred in the slide bearing in accordance with the rotational frequency fr of the slide bearing.

A cepstrum analysis is an analytical method which applies an inverse Fourier transform after the amplitude of the spectrum which has been obtained by applying a Fourier transform to the acceleration waveform detected by a piezoelectric acceleration sensor has been subjected to a logarithmic transformation, and it finds the regularity of the generation frequency component of the spectrum. If the spectrum has regularity, a peak of a period referred to as the quefrency will occur.

In addition to the cepstrum analysis, it is possible to obtain the characteristic value by an auto-correlation analysis. When N-number of acceleration data is collected at a sampling frequency Z [Hz], the acceleration spectrum of a frequency domain can be decomposed into an N-number of frequency domains from Z/N [Hz] to Z [Hz]. However, a commonly effective frequency domain is less than half of Z [Hz]. The acceleration spectrum is shown here with an X as a data column (vector) until length N'. With respect to this X, an auto-correlation, as in formula 1 below, is calculated, with m being 0 to N'-1. When a minor rubbing has occurred, since a plurality of peaks exists at a revolution speed interval of a shaft, a large peak value will appear when m of Rxx(m) (in frequency conversion, m*Z/N [Hz]) is a value which corresponds to a multiple of the rotational period. With a peak being other than a multiple of zero, for example, the first peak value as the characteristic value, it can be determined that an abnormality has occurred in the slide bearing when the characteristic value has exceeded the threshold value.

$$\text{Auto-Correlation } Rxx(m) = \sum_{n=0}^{N'-m-1} X_n * X_{n+m} / (N' - m) \quad \text{Formula 1}$$

$$m: 0 \text{ to } N' - 1$$

In addition to the cepstrum analysis or the auto-correlation analysis, it is possible to obtain the characteristic value even in a cross-correlation analysis. Namely, it is possible to obtain the characteristic value by a cross-correlation of the acceleration spectrum X and an artificial spectrum (referred to as the template waveform) Y which has a predetermined peak of a rectangular or Gaussian distribution at a rotational period interval of a shaft. The data length of the template waveform Y can be configured from a waveform that is the same as the acceleration spectrum X or shorter. With the length of the Y waveform being M, when the length of M is shorter than that of length N' of the acceleration spectrum X, 0 is added such that the length is the same as that of X and then calculated in formula 2. When a minor rubbing has occurred, since a plurality of peaks exists at a revolution speed interval of a shaft, a large peak value will appear when m of Rxy(m) is a value which corresponds to a multiple of the rotational period. However, if the calculation is made as in formula 2, the foremost position of the firstly-obtained peak which deviates from the rotational frequency of the shaft, and the peak position thereafter may also deviate in the same amount. In Rxy(m), the m in which Rxy is at a maximum between m=0 and m being the rotational frequency is determined, and the m is changed into m=0, thereby correcting the amount of deviation.

$$\text{Cross-Correlation } Rxy(m) = \sum_{n=0}^{M-m-1} X_n * X_{n+m} / (M - m) \quad \text{Formula 2}$$

$$m: 0 \text{ to } M - 1$$

In the diagnostic method of the present invention, a predetermined artificial spectrum having a peak for each rotational frequency of a shaft is prepared in advance as a spectrum of a frequency domain of a vibration acceleration, a cross-correlation between the artificial spectrum and the acceleration spectrum is calculated, and the characteristic value is calculated in a predetermined frequency domain comprising the highest frequency domain of the cross-correlation.

Furthermore, the present inventors have found out that it is preferable to limit the frequency domain for calculating the characteristic value in a spectrum of the frequency domain which calculates the above auto-correlation or the cross-correlation. Namely, the present inventors have found out that there exist cases where there is a frequency domain in which a plurality of peaks at a rotational frequency interval of the shaft involved in the occurrence of the rubbing is remarkable and cases where there is a frequency domain in which a peak not at a rotational frequency interval is remarkable. Therefore, it is preferable to limit the frequency domain for obtaining the characteristic value. Preferable frequencies mean that the characteristic value is calculated in a predetermined frequency domain from 1,000 [Hz] to 20,000 [Hz]. The method of determining a predetermined frequency is capable of determining the frequency at the periphery where the peak has occurred in, for example, the frequency spectrum. Moreover, a template having a peak for every rotational frequency of the shaft described above is prepared, a value in which an average of the template length is added to m in formula 2 where the cross-correlation Rxy is at a maximum is calculated, and the frequency corresponding to the calculated value is determined. The frequency thus determined is the one which would have the maximum correlation with the template and such frequency can be determined within a predetermined range comprising said frequency. The periphery of the maximum peak in the spectrum of the frequency domain from 1,000 [Hz] to 20,000 [Hz] may alternatively be used, but the above method can obtain more preferable results.

According to the comparative test conducted by the present inventors, a specific diagnostic difference due to the difference in material of the member (jig) contacting the slide bearing cannot be recognized, and a specific difference also could not be found in the materials or characteristics of the slide bearing. Furthermore, if 1 k-10 kHz, being a range in which the spectrum appears remarkably, is measured, it has been found that a rubbing phenomenon can be detected regardless of the difference in material (tin, copper, aluminum, etc.) of the slide bearing. During the above diagnosis, it is preferable to detect data at least in a range of 1 k-30 kHz, more preferably the data at least in the range of 1 k-10 kHz, as waveform data representing the vibration acceleration.

In a diagnostic method according to the present invention, a minor rubbing can be found quantitatively by using peak information of a plurality of acceleration spectra which is frequency-modulated at a rotational frequency of the shaft as described above. According to the diagnostic method of the present invention, an abnormality can be detected early and accurately by only using an acceleration sensor and without the need to use an AE (Acoustic Emission) sensor. Moreover, this can also be applied to a diagnosis in a case where a vibration noise associated with a piston movement and a burst or supply/exhaust, such as in the slide bearing of a diesel engine, is involved.

As described above, according to the present invention, an abnormal state of the rubbing which conventionally could not be detected by only an acceleration sensor can be detected accurately and at an early point. Therefore, for example, if a minor rubbing state can be detected at a diagnosis after a periodical inspection during a trial operation of the slide bearing, an execution failure can be corrected, and a trouble resulting in a burn can be obviated. Detecting a rubbing abnormality in the slide bearing at an early point, as described above, contributes to the stabilization of or the extension of the periodical inspection period for the operation of an appliance or piece of equipment (for example, large-sized critical rotating equipment or rapid rotating equipment such as compressors) comprising the slide bearing, and further to the determination of the remaining life thereof.

Conventionally, the present invention is suitable for being applied to a diesel engine which did not previously have a method of being able to directly diagnose bearing abnormalities. A diesel engine, in general, is configured of a plurality of cylinders and includes the same number of bearings. Therefore, it is difficult to balance all of the bearings due to distortion and the like of the shaft, and thus it is easy for rubbing to occur. Since the bearing may be mounted inside a movable body in a marine engine, it is placed under an even more severe environment. The damage caused due to a breakage while out at sea is significant. According to the present invention, an abnormality of the slide bearing in such diesel engines can be detected, the handling of the component exchange can be performed systematically before fatal damage occurs, and this could largely contribute to safe operations and a reduction in the risk of accidents.

Furthermore, the diagnostic device for a slide bearing which diagnoses an abnormality such as a rubbing in the slide bearing according to the present invention comprises: a revolution speed detection sensor which detects a revolution speed of a rotating shaft; an acceleration sensor which detects an acceleration during a vibration of the rotating shaft; a monitoring device which: transforms waveform data which represents an acceleration of a vibration detected by the acceleration sensor into waveform data of a frequency domain by applying a Fourier transform to the waveform data; obtains a characteristic value with an arithmetic unit which quantifies a plurality of peak information which occurs at a rotational frequency interval in the waveform data of the frequency domain by performing a predetermined signal process combined with rotational frequency information; monitors whether the characteristic value has exceeded a predetermined threshold value; and when the characteristic value has exceeded the threshold value, determines that an abnormality has occurred in the slide bearing; and a reporting device which outputs a determination result to the outside when the monitoring device has determined that an abnormality has occurred in the slide bearing.

Effect of the Invention

According to the present invention, a sign of a minor rubbing abnormality of a slide bearing can be accurately detected.

BRIEF DESCRIPTION OF THE DRAWINGS

FIG. 8 is a graph showing the relation between the gap and the acceleration O/A value.

FIGS. 9A-9D are graphs showing an acceleration spectrum at a revolution speed of 1200 [rpm].

FIG. 11 is a graph showing a relation between a dimensionless sign parameter and a gap.

FIGS. 12A and 12B are graphs showing an acceleration waveform and an acceleration spectrum at a revolution speed of 1200 [rpm] and a gap of 1/100 [mm].

FIG. 14A is a graph showing cepstrum at a revolution speed of 1200 [rpm] and a gap of 15/100 [mm].

FIG. 14B is a graph showing auto-correlation at a revolution speed of 1200 [rpm] and a gap of 15/100 [mm].

FIG. 14C is a graph showing cross-correlation at a revolution speed of 1200 [rpm] and a gap of 15/100 [mm].

FIG. 23A is a diagram of a rotational period quefrency value trend showing an example of a cepstrum, an auto-correlation and a cross-correlation analysis result at a normal state.

FIG. 23B is a diagram of cepstrum at a predetermined time showing an example of a cepstrum, an auto-correlation and a cross-correlation analysis result at a normal state.

FIG. 23C is a diagram of auto-correlation at a predetermined time showing an example of a cepstrum, an auto-correlation and a cross-correlation analysis result at a normal state.

FIG. 23D is a diagram of cross-correlation at a predetermined time showing an example of a cepstrum, an auto-correlation and a cross-correlation analysis result at a normal state.

MODE FOR CARRYING OUT THE INVENTION

Figure 1:
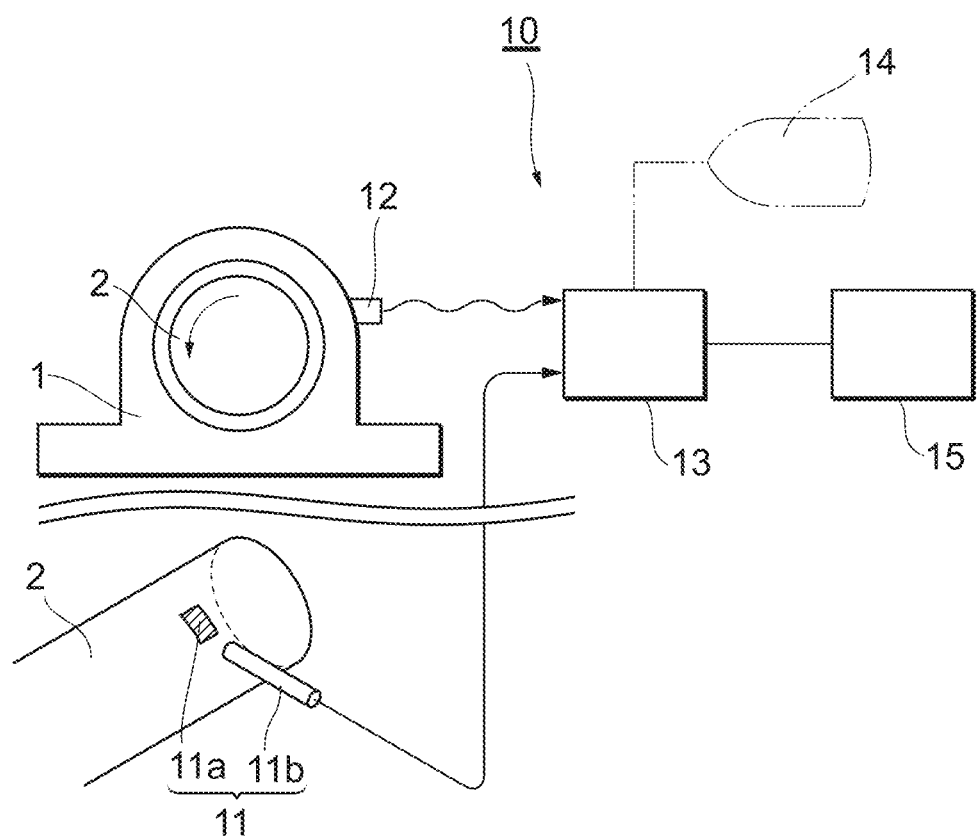
FIG. 1 is a schematic configuration diagram of a diagnostic device for a slide bearing which shows an embodiment of the present invention.

The configuration of the present invention will be described in detail below based on an example of an embodiment shown in the drawing. FIGS. 1-6 show an embodiment of a diagnostic method and a diagnostic device for a slide bearing according to the present invention. Slide bearing 1 is a bearing device of a rotating shaft 2 which is applicable to large-sized critical rotating equipment such as a turbine and rapid rotating equipment such as a compressor. A diagnostic device 10 of the slide bearing 1 according to the present invention comprises a revolution speed detection sensor 11, an acceleration sensor 12, a monitoring device 13 and a reporting device 14. A configuration of the diagnostic device 10 will be first described below (see FIGS. 1, 2, etc.).

The revolution speed detection sensor 11 is a sensor for detecting the revolution speed of the rotating shaft 2. For example, in the present embodiment, the revolution speed detection sensor 11 is configured of a member to be detected 11b that is provided on a surface of the rotating shaft 2 and is made, for example, of a reflective tape which rotates together with the rotating shaft 2, and a pulse detector 11a which detects the rotational pulse of the rotating shaft 2 through the member to be detected 11b (see FIG. 1). The data detected by the pulse detector 11a is transmitted to the monitoring device 13. The revolution speed of the rotating shaft 2 in a real machine is controlled. However, in practice, there are many cases in which the revolution speed varies due to influences such as by the voltage fluctuation. According to such revolution speed detection sensor 11, the pulse can be used to accurately detect the revolution speed even in the case where the revolution speed of the rotating shaft 2 varies from moment to moment.

The acceleration sensor 12 is a sensor for detecting the acceleration during vibration of the rotating shaft 2 based on the vibration at the time when a rubbing phenomenon occurs. For example, in the present embodiment, a piezoelectric acceleration sensor having a piezo element is used to mount the acceleration sensor 12 to a bearing housing of the slide bearing 1 and detects the acceleration based on the vibration of the bearing housing (see FIG. 1). The detection data of this acceleration sensor 12 is transmitted to the monitoring device 13.

The monitoring device 13 is a device which performs a diagnosis of the slide bearing 1 based on the transmission data from the above revolution speed detection sensor 11 and the transmission data from the acceleration sensor 12, and transmits the result to a reporting device 14 when it is determined that an abnormality has occurred. Particularly, the monitoring device 13 of the present embodiment transforms the waveform data representing the acceleration of the vibration detected by the acceleration sensor 12 to a power spectrum of a frequency domain by applying a Fourier transform thereto; quantifies a plurality of peak information occurring at a rotational frequency interval of a shaft in the spectrum by performing a predetermined signal process combined with rotational frequency information of the shaft; obtains a characteristic value; monitors whether the obtained characteristic value has exceeded a predetermined threshold value; and when the characteristic value has exceeded the threshold value, determines that an abnormality has occurred in the slide bearing 1. Moreover, the monitoring device 13 of the present embodiment is connected to an arithmetic processing unit (for example, a personal computer).

The reporting device 14 is a device for outputting the diagnosis result when the monitoring device 13 determines that an abnormality has occurred in the slide bearing 1 and reporting the same to the user and the involved parties. The reporting device 14 may report to the outside, for example, by flashing a light or ringing an alarm sound, or may report to the involved parties by using a screen of the arithmetic processing unit 15.

Then, a diagnostic method for the slide bearing 1 using such diagnostic device 10 and the principle thereof will be described below (see FIGS. 4A to 4C, etc.).

Figure 2:
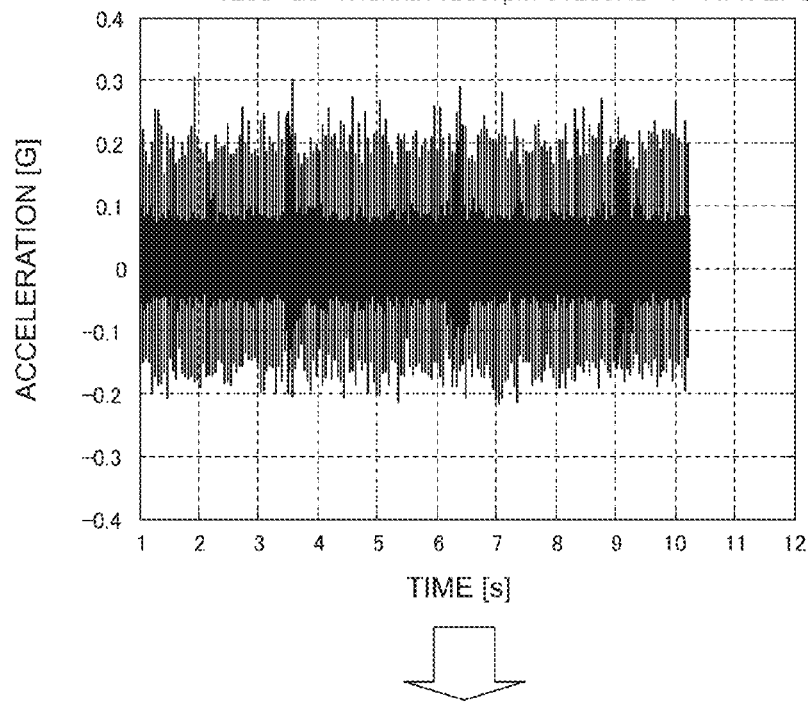
FIG. 2 is a diagram showing an example of acceleration waveform data obtained by using a revolution speed sensor and an acceleration sensor.

If the revolution speed detection sensor 11 and the acceleration sensor 12 of the above diagnostic device 10 are used, as with the prior art, the acceleration waveform data in which the time is the horizontal axis can be detected (see FIG. 2). If an abnormality has occurred in the slide bearing 1, unless the acceleration of the vibration which occurs due to the abnormality is significantly large, the change in acceleration amplitude in the acceleration waveform data, for example, when a minor rubbing has occurred, will be small, and it is extremely difficult to detect the existence of the abnormality only from this waveform data.

Figure 3:
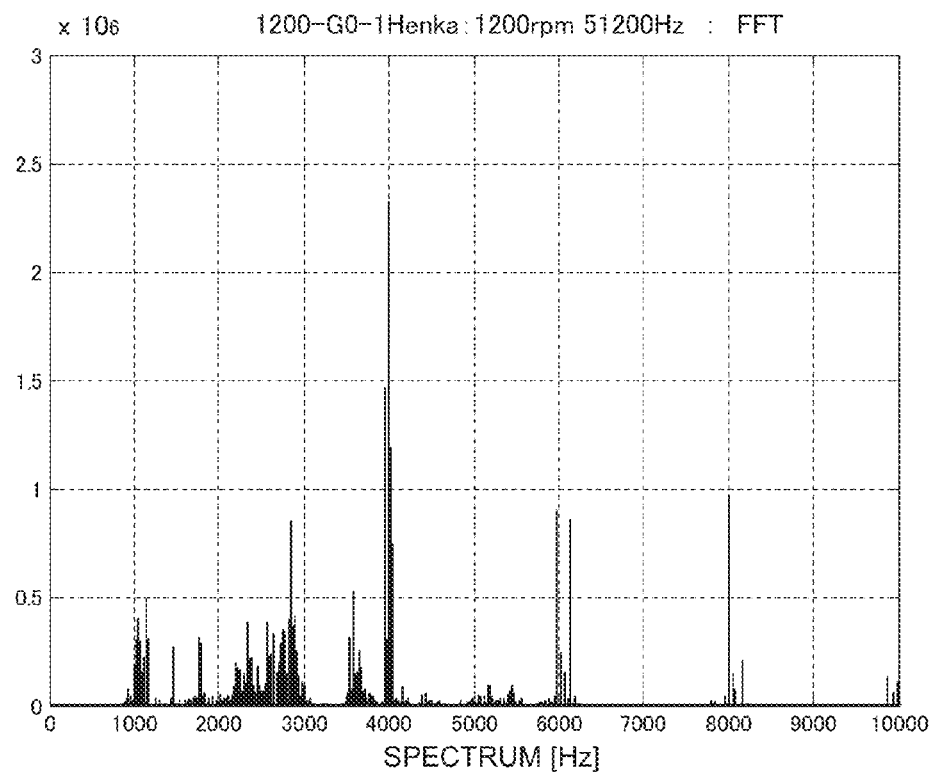
FIG. 3 is waveform data (power spectrum) of a frequency domain in which a Fourier transform is applied to the acceleration waveform data of FIG. 2.
Figure 4:
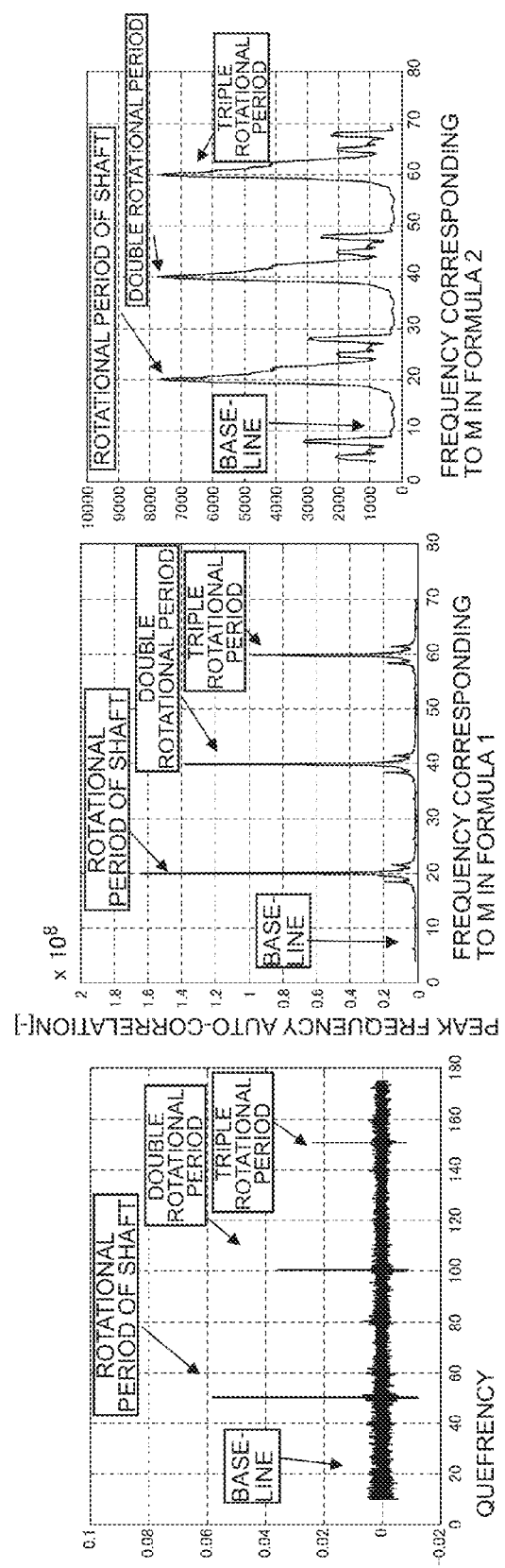
FIG. 4A shows each of the characteristic values of cepstrum obtained from the acceleration spectrum.
FIG. 4B shows each of the characteristic values of auto-correlation obtained from the acceleration spectrum.
FIG. 4C shows each of the characteristic values of cross-correlation obtained from the acceleration spectrum.
Figure 5:
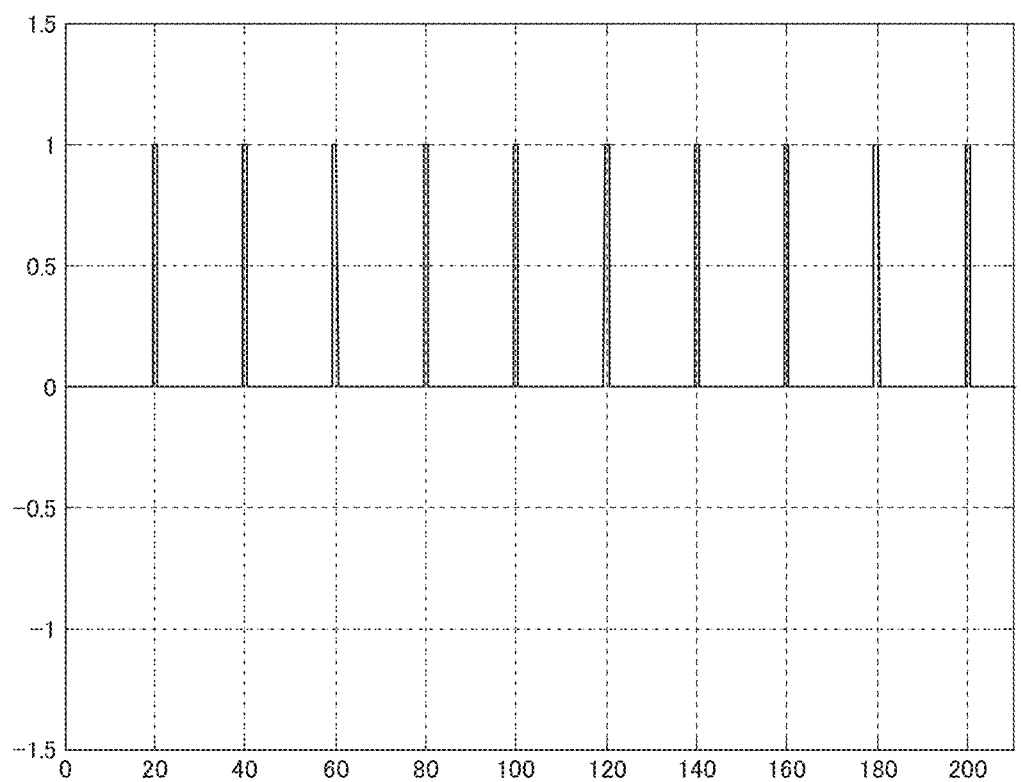
FIG. 5 is an example of a template used in a cross-correlation.
Figure 6:
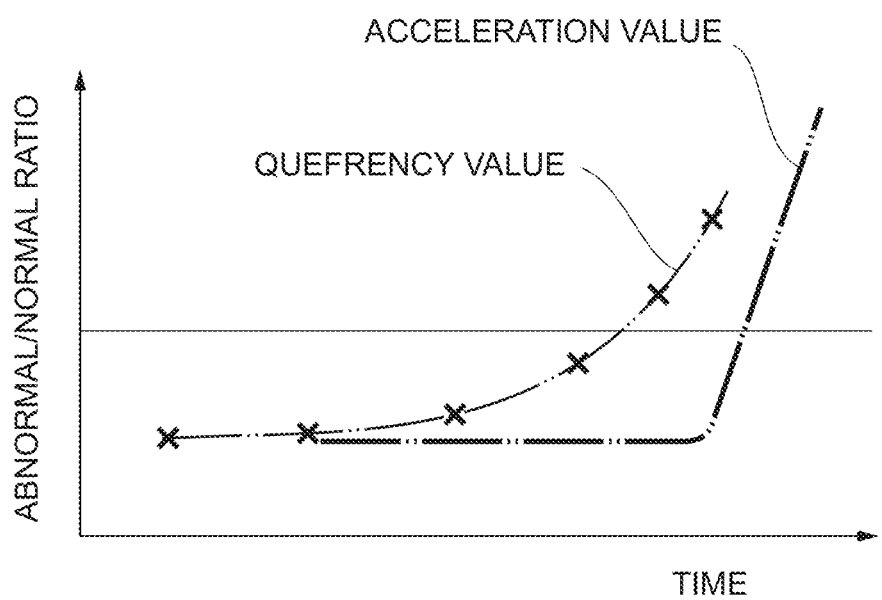
FIG. 6 is a graph showing an example of a temporal change in the characteristic value.

Here, in the present embodiment, the acceleration waveform data is subjected to a Fourier transform to analyze the frequency, and the waveform data of the frequency domain is obtained (see FIG. 3). This causes a power spectrum with the frequency being the horizontal axis to be obtained.

The plurality of peak information which occurs at a rotational frequency interval of the shaft at the spectrum is quantified by performing a predetermined signal process combined with the rotational frequency information of the shaft to obtain a characteristic value.

As a more specific detection method of the characteristic value, the logarithm spectrum of the spectrum of the frequency domain is calculated, the logarithm spectrum is subjected to an inverse Fourier transform (cepstrum calculation), and a quefrency value obtained from the waveform data after the cepstrum calculation is used (see FIG. 4A). Since the quefrency has a peak at a position of a multiple of a rotational period of the shaft, the plurality of peaks may be added to obtain a characteristic value.

Moreover, as a characteristic value, it is possible to use an auto-correlation value of the acceleration spectrum as described below (see FIG. 4B). Namely, when N-number (524288 in the present embodiment) of acceleration data is collected at a sampling frequency Z[Hz] (51,200 [Hz]) in the present embodiment), the acceleration spectrum of the frequency domain can be decomposed into N-number of frequency domains from Z/N [Hz] to Z [Hz]. However, a commonly effective frequency domain is less than half of Z [Hz]. The spectrum is shown here with an X as a data column (vector) until length N'. With respect to this X, an auto-correlation as in the above formula 1 is calculated, with m being from 0 to N'−1. When a minor rubbing has occurred, since a plurality of peaks exists at a revolution speed interval of a shaft, a large peak value will appear when the m of Rxx(m) (in a frequency conversion, m*Z/N [Hz]) is a value which corresponds to a multiple of the rotational period. A peak having other than a multiple of zero, for example, the first peak value, may be the characteristic value.

The frequency domain of the acceleration spectrum in this process is limited from 1,000 [Hz] to 20,000 [Hz] of the effective frequency as described below. A rectangular wave with a peak at a rotational frequency interval is prepared (see FIG. 5). In the present embodiment, a rectangular wave with 10 peaks where the length of the peak width is $1/10^{th}$ of the rotational period is prepared so as to determine a value of m in which the value of the cross-correlation of formula 2 of this rectangular wave and the acceleration spectrum is at a maximum. The average data length w of the rectangular wave is determined. The value R [Hz] of the frequency (m+w)×Z/N [Hz] is the center frequency of the acceleration spectrum which has the highest correlation with the rectangular wave. In the present example, the range of ±1,000 [Hz] of the value R [Hz] is designated. For this calculation, when the minimum value of the range is below the minimum value of the effective frequency (1,000 [Hz] in the present example), the range of 1,000 [Hz] to 3,000 [Hz] is designated. If the value exceeds the upper limit of the effective range (20,000 [Hz] in the present example), the range is 18,000 [Hz] to 20,000 [Hz].

However, instead of the rectangular wave used for determining the frequency, other waveforms such as a Gaussian distribution can also be used. The peak width or length is not limited to the above.

For specifying the frequency of the acceleration spectrum for use in calculation of the auto-correlation, the users can determine the range from the acceleration spectrum.

The peak value of the auto-correlation which is the characteristic value described above may be affected by the base line (see FIG. 4B), and it is desirable to subtract the base line amount or to divide the peak value by the average value of the base line. In the present example, with the 0.7-0.8 period part of the fundamental frequency being the base, the average value is subtracted.

Since the auto-correlation has a peak at a position of a multiple of a rotational period of the shaft, a plurality of peaks may be added to obtain the characteristic value.

In addition, the following cross-correlation of the acceleration spectrum may be used as the characteristic value (see FIG. 4C). Namely, the characteristic value can be obtained by a cross-correlation of an artificial spectrum (referred to as a template waveform) Y, which has a predetermined peak such as a rectangular or Gaussian distribution at a rotational period interval of a shaft, and the acceleration spectrum X described above. The data length of the template waveform Y may be the same as the acceleration spectrum X or may be configured of a shorter waveform. When the length of the Y waveform is M and the M is shorter than length N' of the acceleration spectrum X, zero may be added so as to make M the same length as X and calculated in formula 2 described above. Since a plurality of peaks exists at a revolution speed interval of the shaft when a minor rubbing occurs, a large peak appears when the m of Rxy(m) is a value corresponding to the multiple of the rotational period. However, with the calculation of only formula 2, the foremost position of the peak first obtained deviates from the rotational frequency of the shaft, and the peak position thereafter may also deviate in the same amount. In Rxy(m), the m in which Rxy is at a maximum between m=0 and m being the rotational frequency is determined, and the m is changed into m=0, thereby correcting the amount of deviation.

In this case, in the present embodiment, the correction of the peak by the base line and the frequency of the acceleration spectrum which calculates the cross-correlation both employ the same method as in the case of the auto-correlation.

The template which determines the cross-correlation has a width of $\frac{1}{10}^{th}$ of the rotational frequency of the shaft, and for the range specified by the acceleration spectrum, the range that is shorter for 2.5 periods of the rotational frequency of the shaft has been used.

However, if the template has peaks at a rotational frequency interval of the shaft, it is not limited to a rectangular wave. Moreover, the width and the length of the peak are not limited to those of the present embodiment. Since the cross-correlation has peaks at positions for multiples of the rotational period of the shaft, a plurality of peaks may be added to obtain the characteristic value.

In the present embodiment, if time series data of a characteristic value which is obtained by quantifying the value of the peak at a rotational frequency interval of the shaft as described above is obtained, monitoring is performed as to whether or not the characteristic value has exceeded the predetermined threshold value. In general, the characteristic value tends to remarkably increase when an abnormality such as a rubbing occurs in the slide bearing 1 (see the two-dot chain line in FIG. 6). With respect to this, in the present embodiment, a predetermined threshold value is set in advance to this characteristic value, and it is determined that an abnormality has occurred in the slide bearing 1 at the time when the temporally-changed characteristic value L has exceeded the threshold value. As an example, in the present embodiment, a determination that an abnormality (contact) has occurred in the slide bearing 1 is made when the average value of +3σ (standard deviation) in a normal state of the quefrency trend level has been exceeded, and this value is the predetermined threshold value. Needless to say, the way of thinking regarding the threshold value as described above is the same in the case of using the auto-correlation value of the acceleration spectrum as the characteristic value (see FIG. 4B) and in the case of using a cross-correlation of the acceleration spectrum as the characteristic value (see FIG. 4C).

Figure 27:
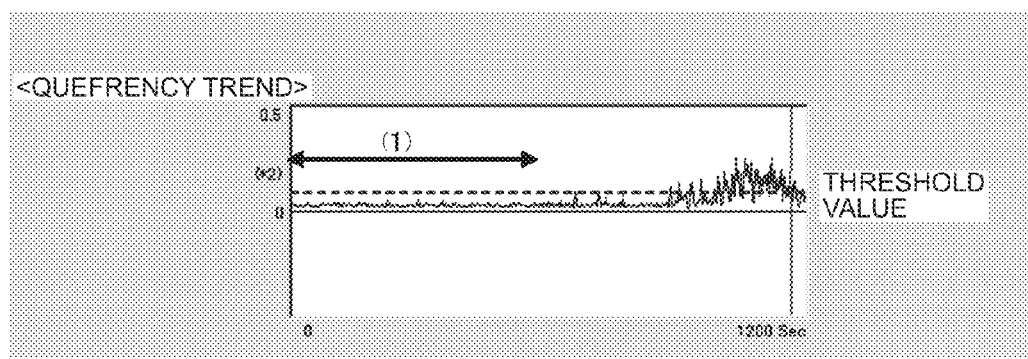
FIG. 27 is a graph showing a configuration example of a threshold value.

Here, the threshold value will be further explained based on the specific example shown in FIG. 27. In FIG. 27, in the range of (1), which is a normal state, the average value of the quefrency trend level determined by the calculation from the actual data is 0.0343 and the standard deviation σ is 0.0071. In this case, the average value of +3σr is 0.00556 (see the broken line which represents the threshold value in FIG. 27).

Alternatively, as a separate example of the above, double the average value of the quefrency trend level may be used as the predetermined threshold value. In this case, although the threshold value may be a value that is slightly larger than the average value of +3σ, there is no practical issue.

According to the analysis of the characteristic value obtained by quantifying the value of the peak at a rotational frequency interval of the shaft as described above, the periodicity buried in the spectrum can be detected and the fundamental frequency (or the inverse of the fundamental frequency) can be determined. Based on this, an accurate detection is possible even in the case of a minor rubbing, and the signs thereof can be found at an early stage. Furthermore, in the present embodiment, a diagnosis of the abnormality which directly uses the conventionally-used acceleration sensor is possible.

The above embodiment is an example of a preferable implementation of the present invention. However, the embodiment is not limited thereto and various modifications may be made within the range which does not depart from the gist of the present invention. For example, in the above embodiment, it has been explained that the slide bearing 1 according to the present invention is applicable to large-sized critical rotating equipment and rapid rotating equipment, such as a compressor. However, it is obvious that the applicable field or range in this case may include the slide bearing of the rotating appliance in, for example, a petrochemical plant, a nuclear power plant, an oil refinery or a steel plant. In addition, it may also be applicable to a bearing with a vibration or acoustic noise caused by a piston movement or a burst in a marine diesel engine or a diesel generator, which has been previously difficult to be detected.

For example, in the case of a 4-stroke cycle used in a diesel generator, a vibration that receives a frequency modulation once in two rotations due to a burst occurs in a diesel engine even in a normal state. When a rubbing occurs, the vibration waveform is subjected to a frequency modulation with a periodicity of the rotational frequency due to the strength of the contact pressure by an eccentricity of the main shaft. When the waveform is subjected to a frequency modulation, a side band of the rotational period occurs in the vibration acceleration spectrum. That is, the signal by the burst and the signal by the rubbing can be separated depending on the occurrence period of the quefrency.

In the case of a 2-stroke cycle used in a diesel engine of a large-sized ship, similar to the rubbing, one quefrency in one rotation occurs in a cylinder head part. It is considered that this is caused due to the structure which absorbs the vibration of the burst by a cross head pin bearing and a crankpin bearing and due to the attenuation in distance caused by the large size. However, it has been recognized that the bearing part is not affected by the burst vibration in a normal state. That is, similar to the diesel generator, the rubbing abnormality can be detected by focusing on the quefrency of the rotational period.

Example 1

An experimental device has been made, and an experiment for verifying the diagnostic method for the slide bearing 1 described above has been performed. The example will be described below.

Figure 7A:
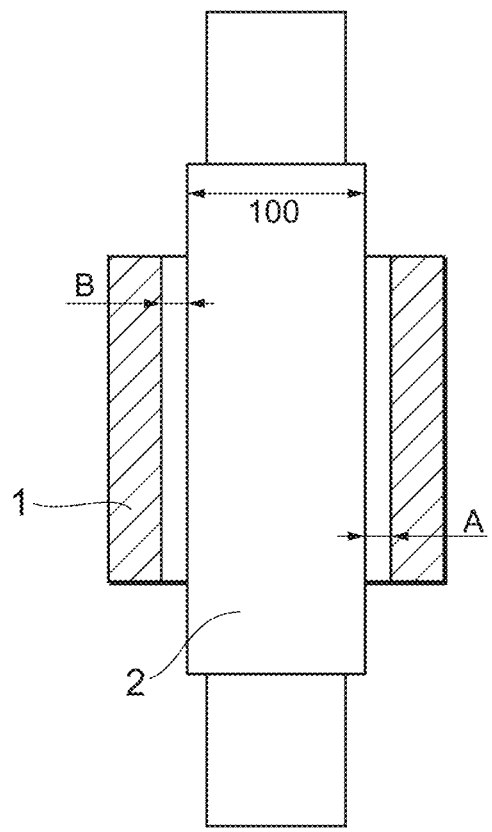
FIG. 7A is a plan view showing an example of a slide bearing consisting of a sample metal used for verification of the present invention.
Figure 7B:
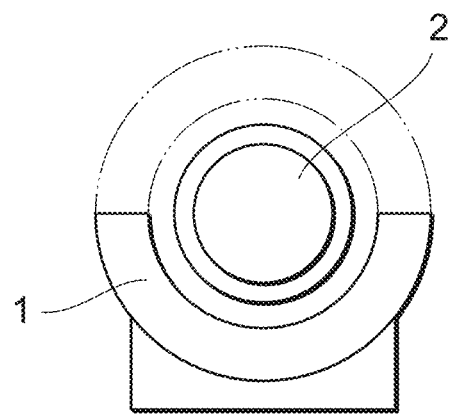
FIG. 7B is a front view showing an example of a slide bearing consisting of a sample metal used for verification of the present invention.
Figure 10A:
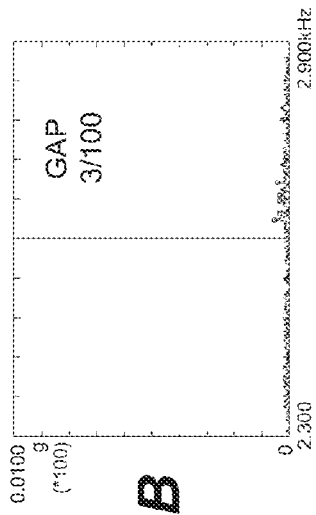
FIGS. 10A-10D are graphs showing a zooming spectrum at a revolution speed of 1200 [rpm].
Figure 10B:
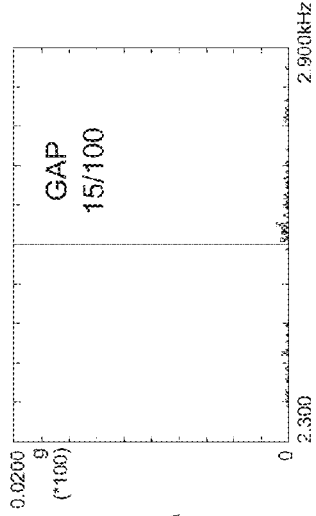
Figure 10C:
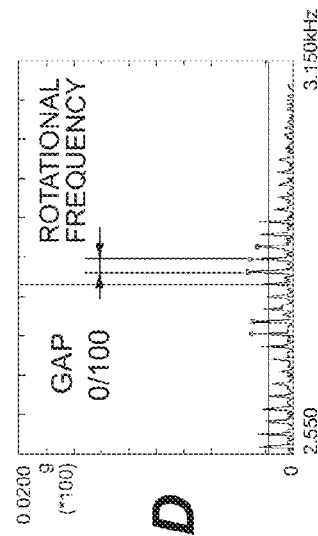
Figure 10D:
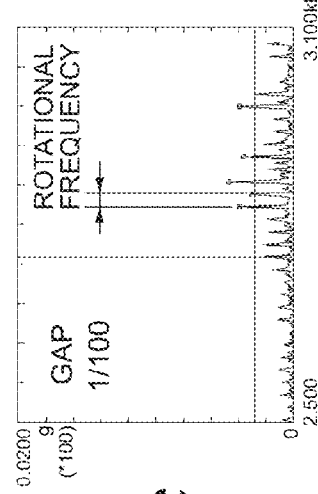

In the experimental device, in a state where the main shaft of the rotating shaft 2 is supported by the slide bearing 1 comprising a sample metal (white metal as a bearing alloy), the rotating shaft 2 was rotated at several speeds (see FIGS. 7A and 7B). Although not shown in detail, in the present example the peripheries of both ends of the rotating shaft 2 were supported by a support bearing (rolling bearing) and a motor was used to rotate the rotating shaft 2.

The outside diameter of the main shaft of the rotating shaft 2 was 100 [mm]. When one of the gaps formed between the rotating shaft 2 and the inner perimeter of the slide bearing (metal casing) 1 was represented as A and the other as B (see FIG. 7A), the total gap (i.e. the sum of A and B) was set as $30/100$ [mm] (therefore, when the total gap of gap A and gap B is $15/100$ [mm], the rotating shaft 2 is positioned at the center of the slide bearing 1). Furthermore, the slide bearing 1 was horizontally moved in a direction perpendicular to the central axis of the rotating shaft 2 by a movement mechanism using a machine bolt (a mechanism which places and pushes the tip of the bolt against the target to be moved so as to move the target) to change the gap B. Using such experimental device, an experiment was performed with the rotational speeds of 1200 [rpm], 1800 [rpm] and 2800 [rpm] of the rotating shaft 2. As a result, when rubbing occurred, an increase in the acceleration value was found, but in the case of a minor rubbing, the difference in the acceleration O/A value was approximately 0.01 g. Therefore, it was considered that an evaluation in terms of the acceleration level was difficult (see FIG. 8). The unit g of the acceleration O/A value was the unit of vibration acceleration, with 1 g=9800/mm/s²=9.8 m/s².

Next, when the revolution speed of the rotating shaft 2 was 1200 [rpm], the acceleration spectrum for each of the states where the gaps were $15/100$, $3/100$, $1/100$ (minor rubbing state) and 0/100 (rubbing state) was detected (see FIGS. 9A-9D). Furthermore, a part of each acceleration spectrum was enlarged so as to obtain a zooming spectrum (see FIGS. 10A-10D).

From the result of each of these spectra, the relation between various dimensionless sign parameters and gaps showing a change in shape of the acceleration waveform when the revolution speed is 1200 [rpm] was obtained (see FIG. 11). From this result, an increase in degree of sharpness, crest factor CF and degree of distortion due to a rubbing occurrence was seen. However, it has been found that these changes were small in the case of a minor rubbing. The degree of distortion $\beta_1$, degree of sharpness $\beta_2$, crest factor CF, shaped factor SF, coefficient of variation C.V (dimensionless sign parameters), and further the standard deviation s and the k-th moment $\mu_k$ which relate to the dimensionless sign parameters can be determined, respectively, by the following formulae.

$$s = \sqrt{V} = \sqrt{\frac{1}{N-1}\sum_{i=1}^{n}(x_i - \bar{x})^2} \qquad \text{Formula 3}$$

N:Number Of Data $\bar{x}$:Average Value $$\mu_k = \frac{1}{N-1}\sum_{i=1}^{N}(x_i - \bar{x})^k \qquad \text{Formula 4}$$

$$\beta_1 = \frac{\text{Third Order Moment}}{(\text{Standard Deviation})^3} = \frac{\mu_3}{s^3} \qquad \text{Formula 5}$$

-continued $$\beta_2 = \frac{\text{Fourth Order Moment}}{(\text{Standard Deviation})^4} = \frac{\mu_4}{s^4} \qquad \text{Formula 6}$$

$$\text{Crest Factor } CF = \text{Maximum Value}/\text{RMS Value} \qquad \text{Formula 7}$$

$$\text{Shaped Factor } SF = \text{RMS Value}/\text{Average Value} \qquad \text{Formula 8}$$

$$C.V = \frac{\text{Standard Deviation}}{\text{Average Value}} = \frac{s}{\bar{x}} \qquad \text{Formula 9}$$

Here, the present inventors have considered the acceleration waveform and each waveform of the acceleration spectrum when the revolution speed is 1200 [rpm] and the gap is $1/100$ [mm] (minor rubbing state) (see FIGS. 12A and 12B). From this result, in the case of a minor rubbing, it has been found that the rising level of the acceleration spectrum was small.

Figure 13:
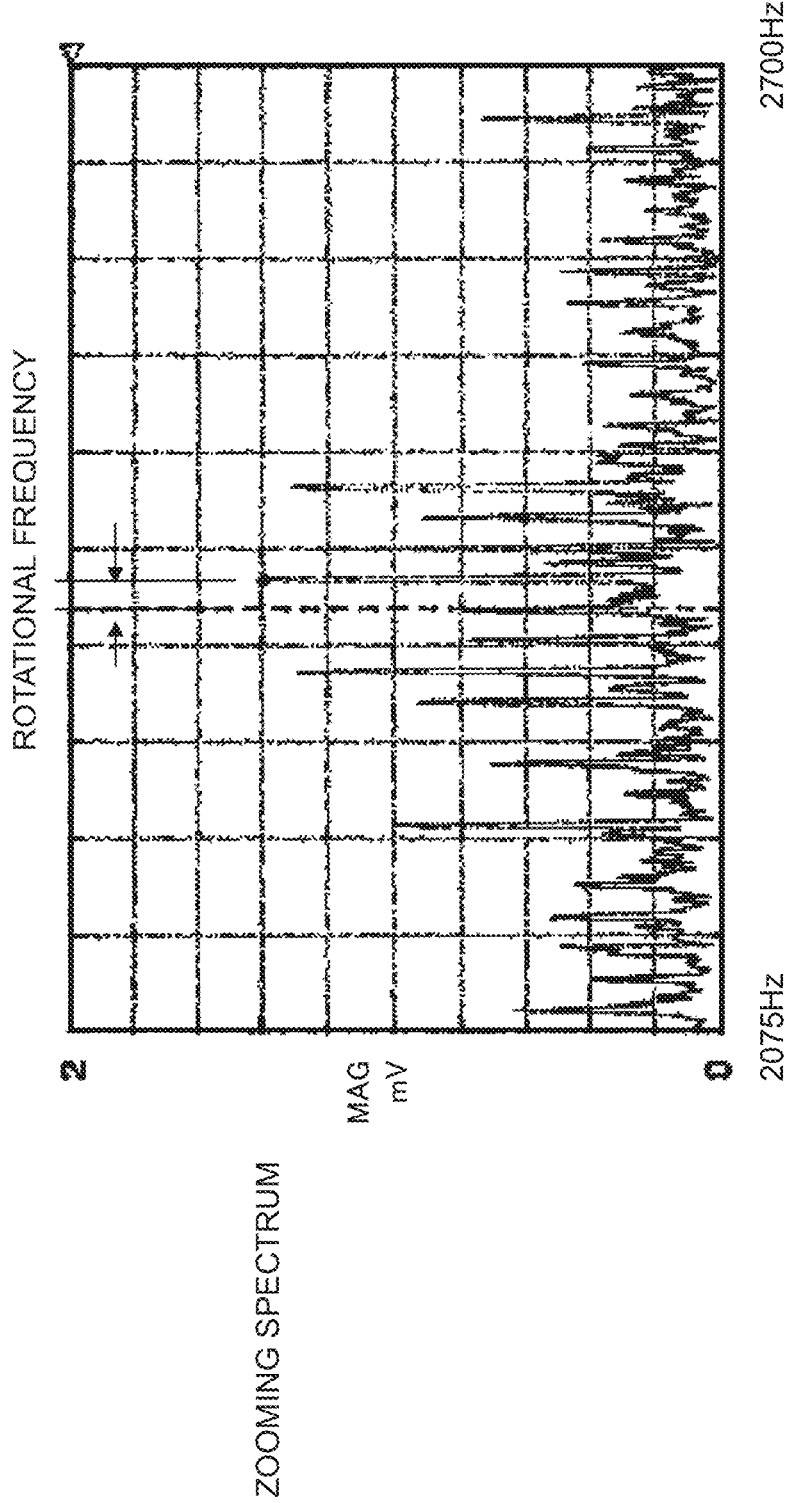
FIG. 13 is a graph showing a zooming spectrum at a revolution speed of 1200 [rpm] and a gap of 1/100 [mm].

Furthermore, the present inventors have also considered the waveform of the zooming spectrum when the revolution speed is 1200 [rpm] and the gap is $1/100$ [mm] (minor rubbing state) (see FIG. 13). From this result, it has been found that when a rubbing occurs, the acceleration spectrum is modulated by the rotational frequency.

Figure 15C:
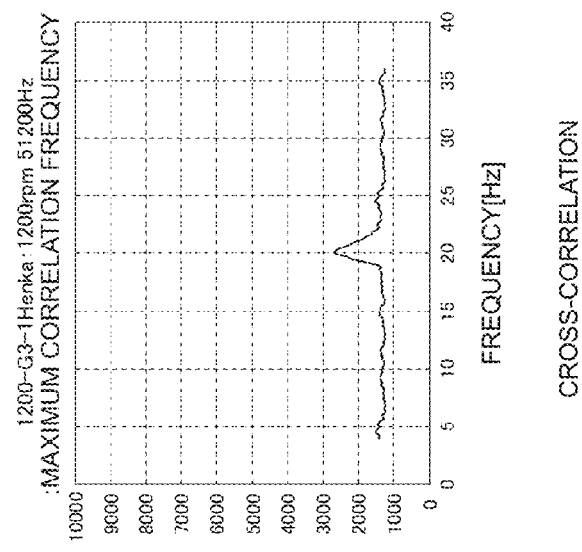
FIG. 15C is a graph showing cross-correlation at a revolution speed of 1200 [rpm] and a gap of 3/100 [mm].
Figure 15B:
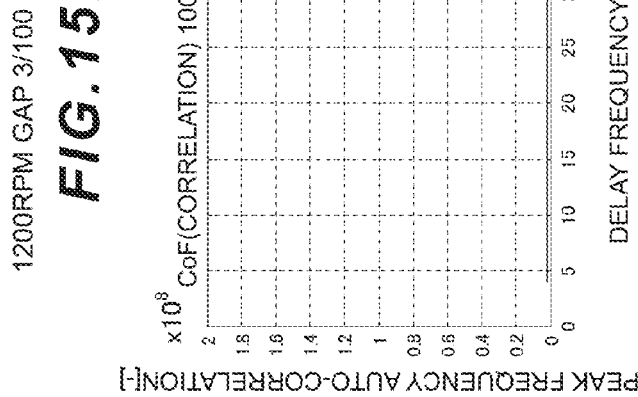
FIG. 15B is a graph showing auto-correlation at a revolution speed of 1200 [rpm] and a gap of 3/100 [mm].
Figure 15A:
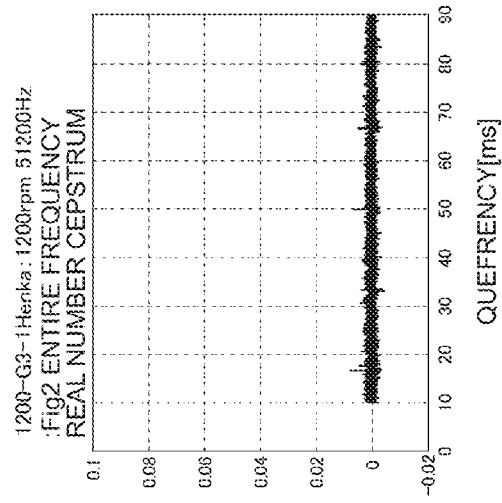
FIG. 15A is a graph showing cepstrum at a revolution speed of 1200 [rpm] and a gap of 3/100 [mm].
Figures 16A, 16B, 16C:
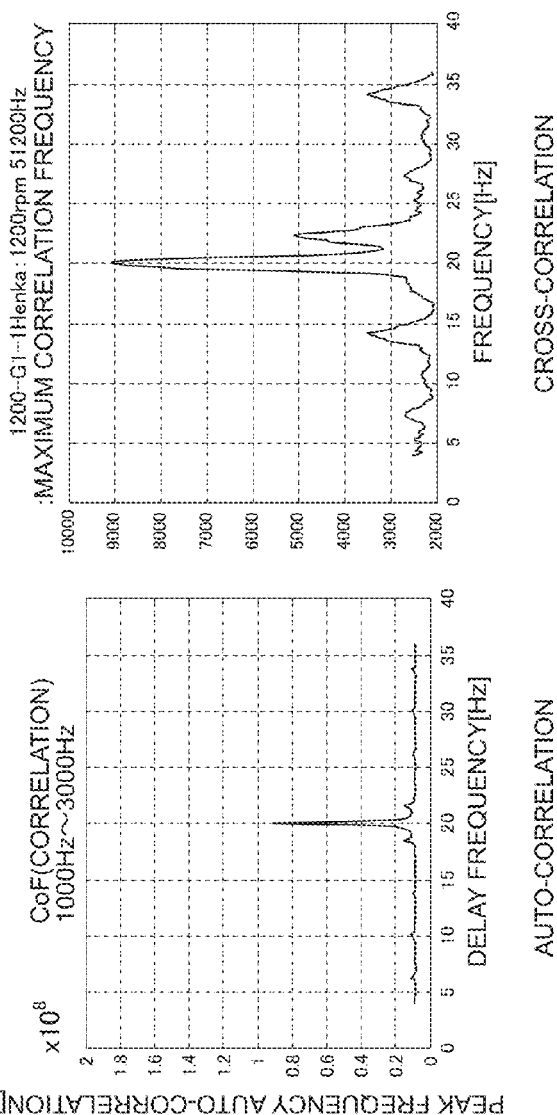
FIG. 16A is a graph showing cepstrum at a revolution speed of 1200 [rpm] and a gap of 1/100 [mm].
FIG. 16B is a graph showing auto-correlation at a revolution speed of 1200 [rpm] and a gap of 1/100 [mm].
FIG. 16C is a graph showing cross-correlation at a revolution speed of 1200 [rpm] and a gap of 1/100 [mm].
Figures 17A, 17B, 17C:
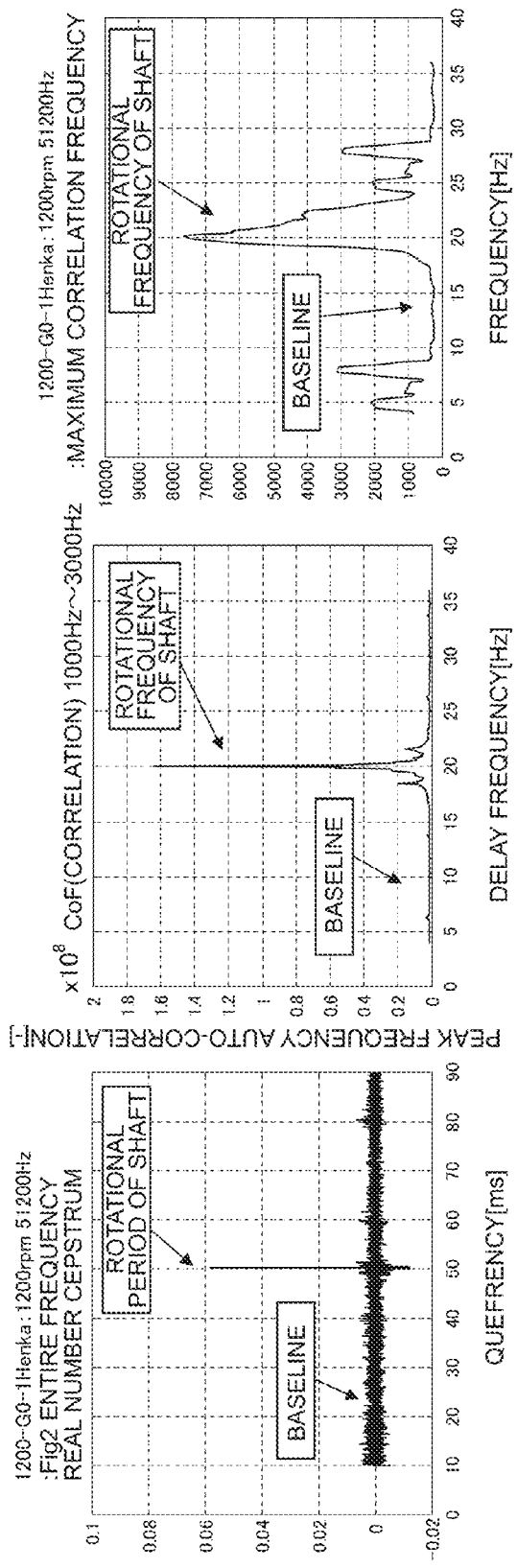
FIG. 17A is a graph showing cepstrum at a revolution speed of 1200 [rpm] and a gap of 0/100 [mm].
FIG. 17B is a graph showing auto-correlation at a revolution speed of 1200 [rpm] and a gap of 0/100 [mm].
FIG. 17C is a graph showing cross-correlation at a revolution speed of 1200 [rpm] and a gap of 0/100 [mm].

Moreover, the present inventors have also considered the waveform of cepstrum, the auto-correlation waveform and the cross-correlation waveform when the revolution speed is 1200 [rpm] and the gap is $15/100$ [mm] (contactless state) (see FIGS. 14A to 14C), the waveform of cepstrum, the auto-correlation waveform and the cross-correlation waveform when the revolution speed is 1200 [rpm] and the gap is $3/100$ [mm] (contactless state) (see FIGS. 15A to 15C), the waveform of cepstrum, the auto-correlation waveform and the cross-correlation waveform when the revolution speed is 1200 [rpm] and the gap is $1/100$ [mm] (minor rubbing state) (see FIGS. 16A to 16C), and the waveform of cepstrum, the auto-correlation waveform and the cross-correlation waveform when the revolution speed is 1200 [rpm] and the gap is 0/100 [mm] (rubbing occurrence state) (see FIGS. 17A to 17C), respectively. Since the revolution speed of the rotating shaft 2 was 1200 [rpm], the rotational frequency was 20 Hz, and thus the rotational period was 50 [msec]. For the quefrency value, the auto-correlation value and the cross-correlation value in the cepstrum waveform under a condition where a minor rubbing and a rubbing have occurred, a peak has been found in the part corresponding to the rotational frequency fr (in the case of the present example, 20 Hz) (see FIGS. 16A to 17C).

Figure 18A:
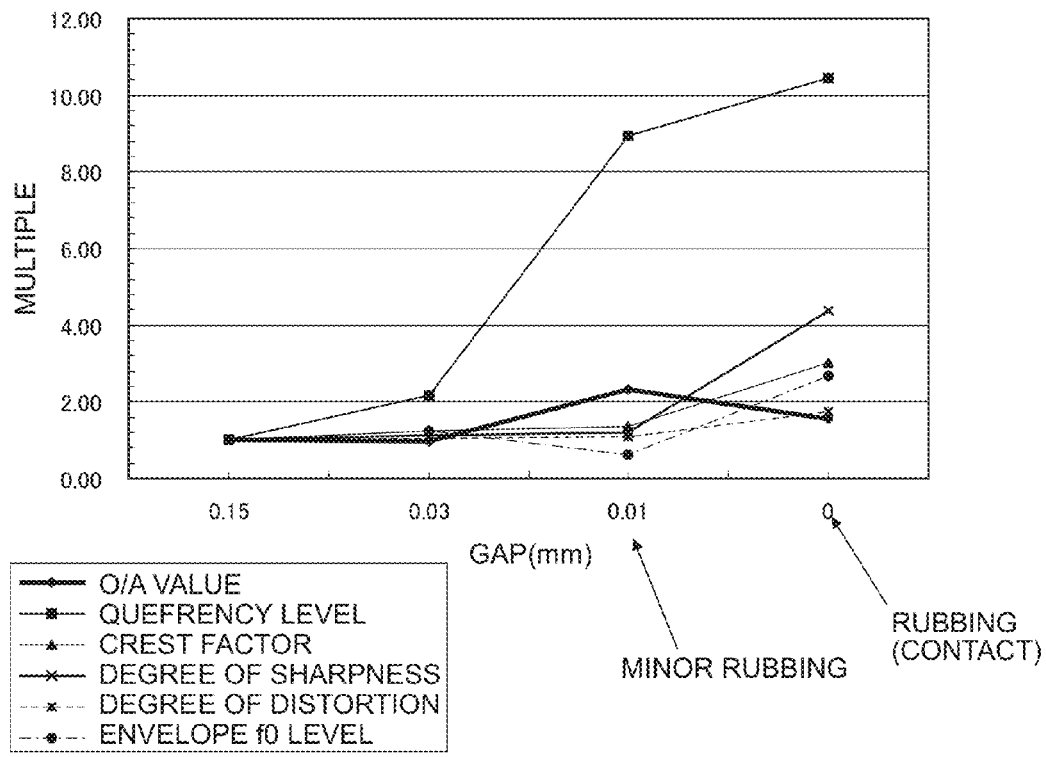
FIG. 18A is a graph showing a comparison between a quefrency level and a conventional method showing a relation between a dimensionless sign parameter and an output ratio (ratio of an output level at an abnormal state and an output level at a normal state) at a revolution speed of 1200 [rpm].
Figure 18B:
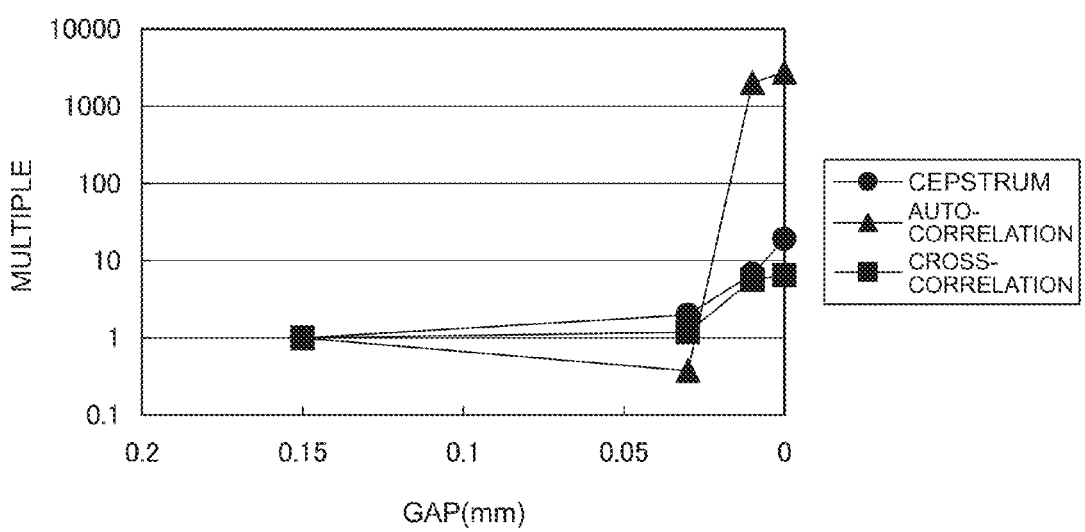
FIG. 18B is a graph showing a comparison between each of the characteristic values showing a relation between a dimensionless sign parameter and an output ratio (ratio of an output level at an abnormal situation and an output level at a normal situation) at a revolution speed of 1200 [rpm].
Figure 19A:
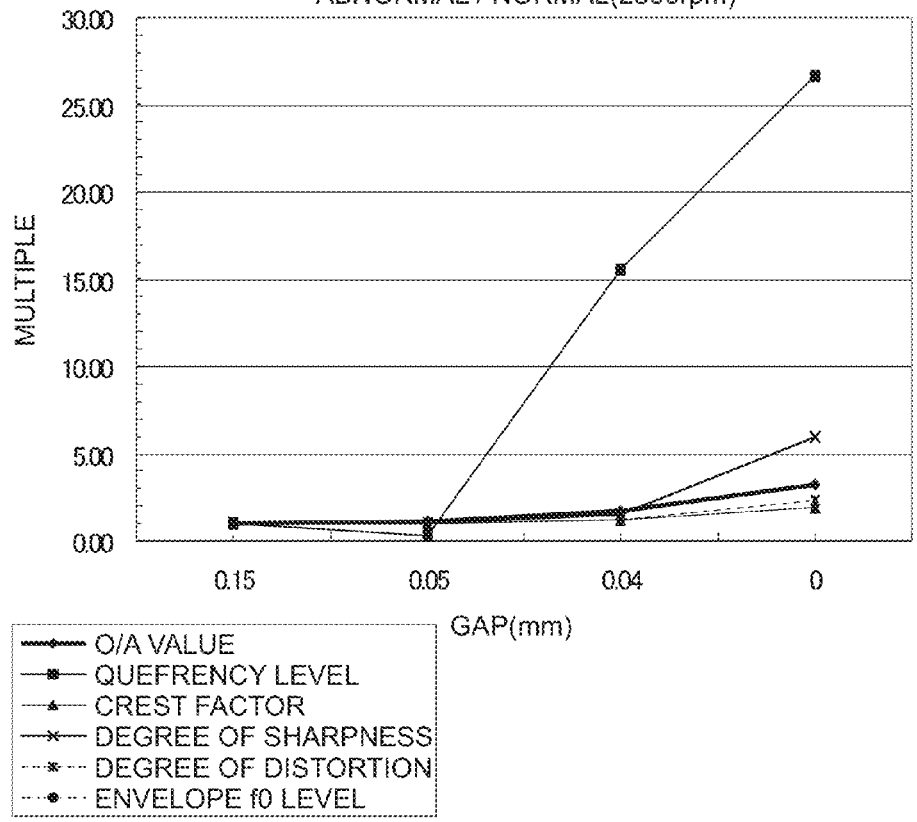
FIG. 19A is a graph showing a comparison between a quefrency level and a conventional method showing a relation between a dimensionless sign parameter and an output ratio (ratio of an output level at an abnormal state and an output level at a normal state) at a revolution speed of 2800 [rpm].
Figure 19B:
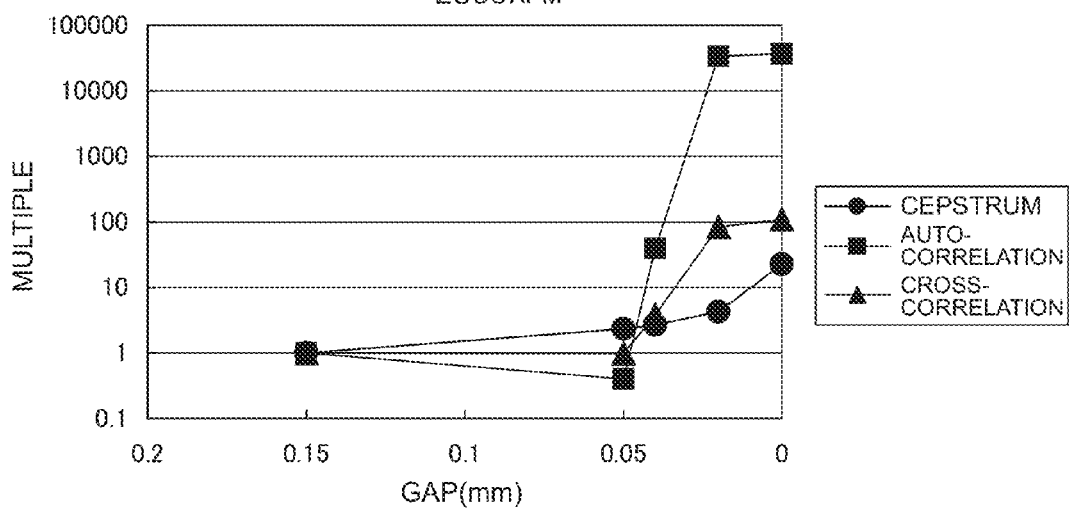
FIG. 19B is a graph showing a comparison between each of the characteristic values showing a relation between a dimensionless sign parameter and an output ratio (ratio of an output level at an abnormal state and an output level at a normal state) at a revolution speed of 2800 [rpm].
Figure 20A:
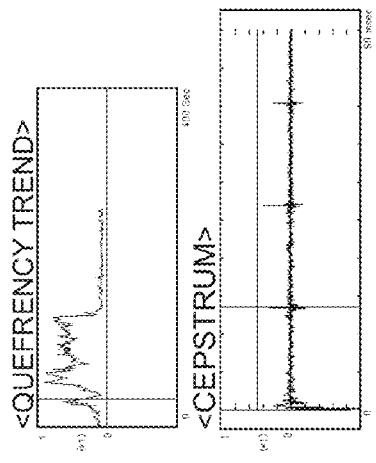
FIGS. 20A to 20D are graphs showing a quefrency trend and a cepstrum at each gap.
Figure 20B:
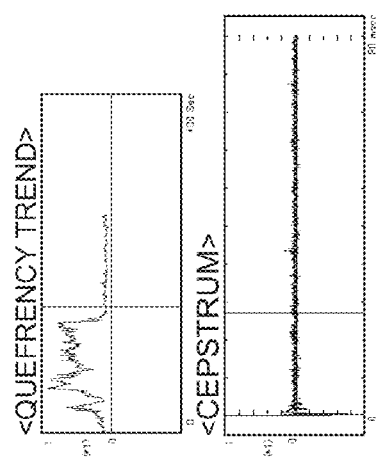
Figure 20C:
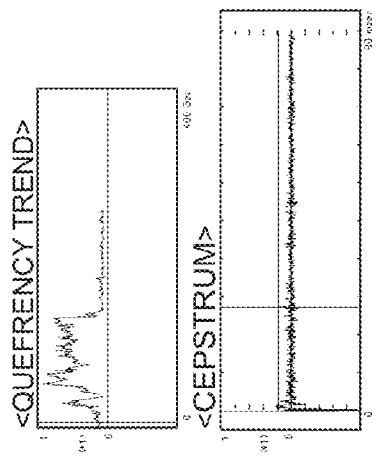
Figure 20D:
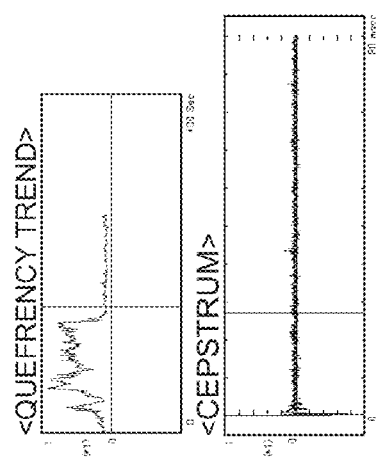

Subsequently, the present inventors have considered the ratio of the output level at an abnormal state and the output level at a normal state when the revolution speed is 1200 [rpm] (see FIGS. 18A and 18B). At either the minor rubbing state or the rubbing (contact) occurrence state, it has been found that the output ratio in the quefrency level, the auto-correlation and the cross-correlation (the output level at an abnormal state/the output level at a normal state) was larger than the output ratio by the other parameters (such as the output ratio of the O/A value). Similarly, also when the revolution speed was 2800 [rpm], the output ratio in the quefrency level, the auto-correlation and the cross-correlation has been found to be larger than that of the conventional method (see FIGS. 19A and 19B).

Subsequently, the present inventors have considered the quefrency trend and the cepstrum when the gap was $2/100$ (minor rubbing state), 0/100 (rubbing state) and $15/100$ (contactless state), respectively (see FIG. 21). From the above, it has been found that a minor rubbing state can be detected by monitoring the quefrency value after the cepstrum calculation. The same detection result was also obtained in the auto-correlation analysis and in the cross-correlation analysis.

Example 2

The present inventors have tried to apply the cepstrum, auto-correlation and cross-correlation analysis method for a vibration measurement in a trial operation in a large-sized marine diesel engine.

Figure 21:
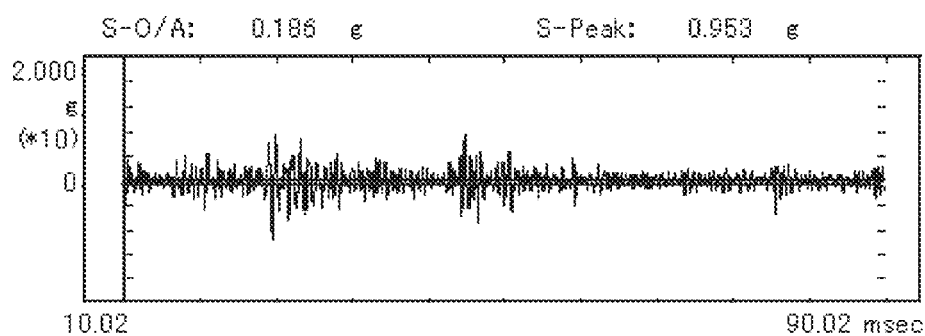
FIG. 21 is a graph showing an example of an acceleration time-axis waveform at a normal state (revolution speed 94 rpm).
Figure 22:
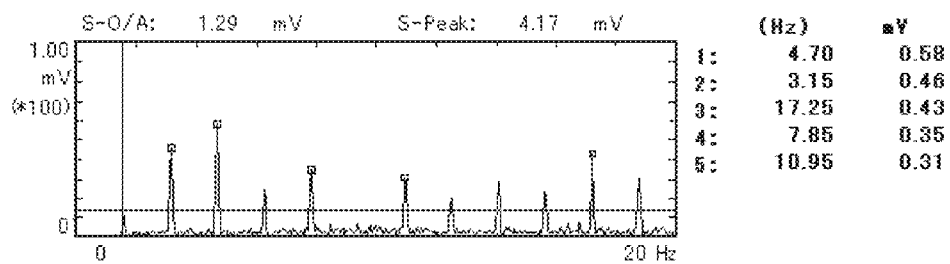
FIG. 22 is a graph showing an example of an acceleration envelope spectrum at a normal state (revolution speed 94 rpm).
Figures 24A, 24B, 24C, 24D:
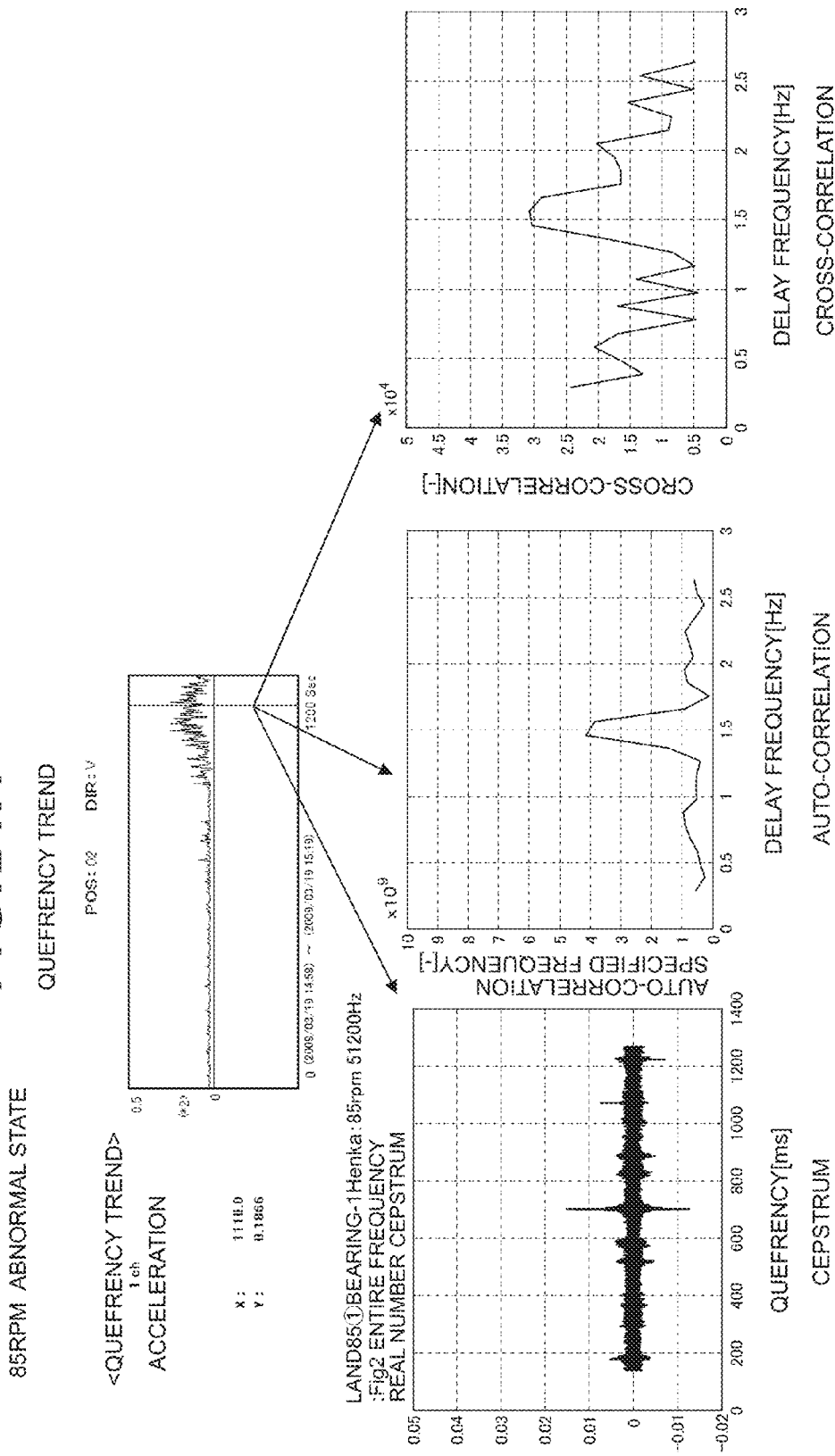
FIG. 24A is a diagram of a rotational period quefrency value trend showing an example of a cepstrum, an auto-correlation and a cross-correlation analysis result at a minor rubbing occurrence (revolution speed 85 rpm).
FIG. 24B is a diagram of cepstrum showing an example of a cepstrum, an auto-correlation and a cross-correlation analysis result at a minor rubbing occurrence (revolution speed 85 rpm).
FIG. 24C is a diagram of auto-correlation showing an example of a cepstrum, an auto-correlation and a cross-correlation analysis result at a minor rubbing occurrence (revolution speed 85 rpm).
FIG. 24D is a diagram of cross-correlation showing an example of a cepstrum, an auto-correlation and a cross-correlation analysis result at a minor rubbing occurrence (revolution speed 85 rpm).

Generally, in the case of a diesel engine, even during a normal calculation, a vibration occurs which is subjected to an amplitude modulation involved in the operation such as the opening/closing of a suction valve or an exhaust valve and an explosive combustion (see FIG. 21). Since the vibration at this point occurs periodically for every rotational period, in an envelope spectrum, the rotational frequency and a high-order component thereof occur (see FIG. 22).

On the other hand, in the cepstrum, auto-correlation and cross-correlation analysis, there is no noise influence during the operation even in a diesel engine, and the occurrence of a peak of a characteristic value corresponding to a rotational period cannot be found or is extremely small in the normal state (see FIGS. 23A to 23D). At approximately 85 rpm when the revolution speed during the present trial operation is changed, a minor rubbing has occurred in the main bearing (slide bearing). In a cepstrum, auto-correlation and cross-correlation analysis result at this point, it has been found that a characteristic value peak exists at a rotational period showing an occurrence of a rubbing (see FIGS. 24A to 24D).

Figure 25:
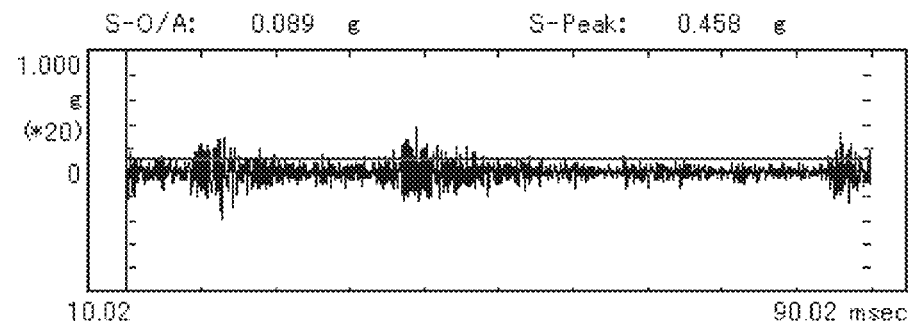
FIG. 25 is a graph showing an example of an acceleration time axis waveform at a minor rubbing occurrence (revolution speed 85 rpm).
Figure 26:
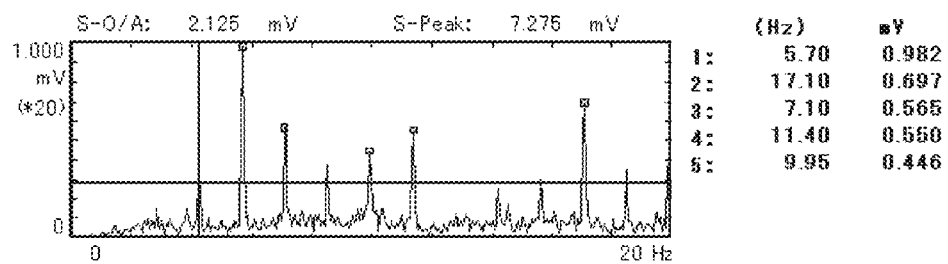
FIG. 26 is a graph showing an example of an acceleration envelope spectrum at a minor rubbing occurrence (revolution speed 85 rpm).

Even in a vibration acceleration waveform at this point, a waveform subjected to an amplitude modulation has been obtained, and it is difficult to differentiate from that during a normal state (see FIG. 25). Similar to during the normal state, even in an envelope spectrum, the occurrence of a rotational frequency and a higher component thereof has been found, and it is difficult to differentiate between the normal state and the abnormal state (see FIG. 26).

The present inventors have obtained or found the following knowledge from the results of the above Examples 1 and 2.

(1) During a minor rubbing of the slide bearing, in the characteristic value which is quantified by a predetermined method from a revolution speed of the shaft and a plurality of peak information generated at a rotational frequency interval of the shaft which occurs on the acceleration spectrum, it has been found that the abnormal/normal output ratio (i.e. the ratio between the output level in an abnormal state and the output level in a normal state) is larger than the output ratio when analyzed by other parameters. Thus, by using this characteristic value, it is possible to improve the accuracy in the diagnosis of the slide bearing 1. Moreover, by monitoring the characteristic value, the minor rubbing state which was previously difficult or not possible to be detected can be detected at an early point using only the piezoelectric acceleration sensor.

(2) A minor rubbing phenomenon can be accurately detected without being affected by the noise during the operation even in an appliance in which it has previously been difficult to detect the rubbing abnormality due to the noise during the operation, particularly, in diesel engines.

INDUSTRIAL APPLICABILITY

The present invention is preferable to be applied to a diagnosis of a slide bearing in a diesel engine.

DESCRIPTION OF REFERENCE NUMERALS

1 . . . Slide Bearing, 2 . . . Rotating Shaft (Shaft), 3 . . . Bearing Housing, 10 . . . Diagnostic Device, 11 . . . Revolution Speed Detection Sensor, 11*a* . . . Pulse Detector, 11*b* Member To Be Detected, 12 . . . Acceleration Sensor, 13 . . . Monitoring Device, 14 . . . Reporting Device, 15 . . . Arithmetic Processing Unit

What is claimed is:

1. A diagnostic method for a slide bearing, the diagnostic method comprising:
   detecting acceleration waveform data which represents an acceleration of a vibration which occurs when a slide bearing is in operation;
   transforming the acceleration waveform data into an acceleration spectrum of a frequency domain by applying a Fourier transform to the acceleration waveform data;
   performing a cepstrum calculation which applies an inverse Fourier transform to the acceleration spectrum after a logarithmic transformation, and obtaining time series data of a quefrency value obtained from the waveform data after the cepstrum calculation; and
   when the quefrency value has exceeded a predetermined threshold value, determining that a rubbing has occurred in the slide bearing.

2. A diagnostic method for a slide bearing, comprising:
   detecting acceleration waveform data which represents an acceleration of a vibration which occurs when a slide bearing is in operation;
   transforming the acceleration waveform data into an acceleration spectrum of a frequency domain by applying a Fourier transform to the acceleration waveform data;
   performing a calculation which determines an auto-correlation of the acceleration spectrum, and
   when the value of the auto-correlation obtained from the calculation has exceeded a predetermined threshold value, determining that a rubbing has occurred in the slide bearing.

3. A diagnostic method for a slide bearing, comprising:
   detecting acceleration waveform data which represents an acceleration of a vibration which occurs when a slide bearing is in operation and also detecting a rotational frequency of a rotating shaft;
   transforming the acceleration waveform data into an acceleration spectrum of a frequency domain by applying a Fourier transform to the acceleration waveform data;
   performing a calculation which determines a cross-correlation between the detected acceleration spectrum and a predetermined artificial spectrum having a peak for every rotational frequency of the shaft as the spectrum of the frequency domain of the vibration acceleration, and
   when the value of the cross-correlation obtained from the calculation has exceeded a predetermined threshold value, determining that a rubbing has occurred in the slide bearing.

4. The diagnostic method for a slide bearing according to any one of claims 1, 2 and 3, wherein data of a frequency domain of 1 k to 30 kHz is detected as data which represents the vibration acceleration.

5. The diagnostic method for a slide bearing according to any one of claims 1, 2 and 3, wherein data of a frequency domain of at least 1 k to 10 kHz is detected as data which represents the vibration acceleration.

6. The diagnostic method for a slide bearing according to any one of claims 1, 2 and 3, wherein a slide bearing of a diesel engine is a target that is diagnosed.

7. The diagnostic method for a slide bearing according to claim 3, wherein
a characteristic value is calculated in a predetermined frequency range comprising a frequency domain with the highest cross-correlation.

8. A diagnostic device for a slide bearing which diagnoses an abnormality such as a rubbing in the slide bearing, the diagnostic device comprising:
a revolution speed detection sensor which detects a revolution speed of a rotating shaft;
an acceleration sensor which detects an acceleration during a vibration of the rotating shaft;
a monitoring device which:
transforms waveform data which represents an acceleration of a vibration detected by the acceleration sensor into an acceleration spectrum of a frequency domain by applying a Fourier transform to the waveform data;
performs a cepstrum calculation which applies an inverse Fourier transform to the acceleration spectrum after a logarithmic transformation, and obtains time series data of a quefrency value obtained from the waveform data after the cepstrum calculation;
monitors whether the quefrency value has exceeded a predetermined threshold value; and
when the quefrency value has exceeded the threshold value, determines that a rubbing has occurred in the slide bearing; and
a reporting device which outputs a determination result to the outside when the monitoring device has determined that a rubbing has occurred in the slide bearing.

9. A diagnostic device for a slide bearing which diagnoses an abnormality such as a rubbing in the slide bearing, the diagnostic device comprising:
a revolution speed detection sensor which detects a revolution speed of a rotating shaft;
an acceleration sensor which detects an acceleration during a vibration of the rotating shaft;
a monitoring device which:
transforms waveform data which represents an acceleration of a vibration detected by the acceleration sensor into an acceleration spectrum of a frequency domain by applying a Fourier transform to the waveform data;
performs a calculation which determines an auto-correlation of the acceleration spectrum;
monitors whether the value of the auto-correlation obtained from the calculation has exceeded a predetermined threshold value; and
when the value of the auto-correlation has exceeded the threshold value, determines that a rubbing has occurred in the slide bearing; and
a reporting device which outputs a determination result to the outside when the monitoring device has determined that a rubbing has occurred in the slide bearing.

10. A diagnostic device for a slide bearing which diagnoses an abnormality such as a rubbing in the slide bearing, the diagnostic device comprising:
a revolution speed detection sensor which detects a revolution speed of a rotating shaft;
an acceleration sensor which detects an acceleration during a vibration of the rotating shaft;
a monitoring device which:
transforms waveform data which represents an acceleration of a vibration detected by the acceleration sensor into an acceleration spectrum of a frequency domain by applying a Fourier transform to the waveform data;
prepares, in advance, a predetermined artificial spectrum having a peak for every rotational frequency of the shaft as the spectrum of the frequency domain of the vibration acceleration;
performs a calculation which determines a cross-correlation between the acceleration spectrum and the artificial spectrum;
monitors whether the value of the cross-correlation obtained from the calculation has exceeded a predetermined threshold value; and
when the value of the cross-correlation has exceeded the threshold value, determines that a rubbing has occurred in the slide bearing; and
a reporting device which outputs a determination result to the outside when the monitoring device has determined that a rubbing has occurred in the slide bearing.

11. The diagnostic device for a slide bearing according to any one of claims 8, 9 and 10, wherein a slide bearing of a diesel engine is a target to be diagnosed.

* * * * *